US009584808B2

(12) United States Patent
Seregin et al.

(10) Patent No.: US 9,584,808 B2
(45) Date of Patent: Feb. 28, 2017

(54) DEVICE AND METHOD FOR SCALABLE CODING OF VIDEO INFORMATION

(71) Applicant: QUALCOMM Incorporated, San Diego, CA (US)

(72) Inventors: Vadim Seregin, San Diego, CA (US); Jianle Chen, San Diego, CA (US); Ye-Kui Wang, San Diego, CA (US); Xiang Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 268 days.

(21) Appl. No.: 14/184,633

(22) Filed: Feb. 19, 2014

(65) Prior Publication Data

US 2014/0241437 A1    Aug. 28, 2014

Related U.S. Application Data

(60) Provisional application No. 61/768,342, filed on Feb. 22, 2013.

(51) Int. Cl.
*H04N 7/12* (2006.01)
*H04N 19/105* (2014.01)
(Continued)

(52) U.S. Cl.
CPC ......... *H04N 19/105* (2014.11); *H04N 19/134* (2014.11); *H04N 19/187* (2014.11);
(Continued)

(58) Field of Classification Search
CPC .................................................. H04N 19/105
(Continued)

(56) References Cited

U.S. PATENT DOCUMENTS

2008/0304566 A1* 12/2008 Yoon .................... H04N 19/105
                                                        375/240.12
2009/0010332 A1*  1/2009 Jeon .................... H04N 19/105
                                                        375/240.12
(Continued)

FOREIGN PATENT DOCUMENTS

WO    WO-2006109986 A1    10/2006
WO    WO-2009132896 A1    11/2009

OTHER PUBLICATIONS

J. Boyce et al., "Legacy Base Layer Codec Suppport in SHVS", 12. JCT-VC Meeting; 103. MPEG Meeting; Jan. 14, 2013-Jan. 23, 2014; Geneva; (Joint Collaborative Team on Video Coding of ISO/IEC JTC1/SC29/WG11 and ITU-T SG.16); http://wtpt3.itu.int/av-arch/jvtvc-site; No. JCTVC-L0178, Jan. 1, 2013 (Jan. 7, 2013), 3 pages, XP030113666.*

(Continued)

*Primary Examiner* — Gims Philippe
*Assistant Examiner* — Amir Shahnami
(74) *Attorney, Agent, or Firm* — Knobbe, Martens, Olson & Bear, LLP

(57) ABSTRACT

An apparatus configured to code video information includes a memory unit and a processor in communication with the memory unit. The memory unit is configured to store video information associated with a reference layer (RL) and an enhancement layer, the RL comprising an RL picture having an output region that includes a portion of the RL picture. The processor is configured to determine whether a condition indicates that information outside of the output region is available to predict a current block in the enhancement layer. The processor may encode or decode the video information.

30 Claims, 6 Drawing Sheets

(51) Int. Cl.
    H04N 19/70     (2014.01)
    H04N 19/134    (2014.01)
    H04N 19/187    (2014.01)
    H04N 19/29     (2014.01)
    H04N 19/33     (2014.01)
(52) U.S. Cl.
    CPC ............. *H04N 19/29* (2014.11); *H04N 19/33* (2014.11); *H04N 19/70* (2014.11)
(58) Field of Classification Search
    USPC ........................................ 375/240
    See application file for complete search history.

(56) References Cited

U.S. PATENT DOCUMENTS

2013/0194384 A1\* 8/2013 Hannuksela ........... H04N 19/70 348/43
2014/0003504 A1  1/2014 Ugur et al.

OTHER PUBLICATIONS

Boyce J., et al., "Legacy base layer codec support in SHVC", 12. JCT-VC Meeting; 103. MPEG Meeting; Jan. 14, 2013-Jan. 23, 2013; Geneva; (Joint Collaborative Team on Video Coding of ISO/IEC JTC1/SC29/WG11 and ITU-T SG.16); URL: http://wftp3.itu.int/av-arch/jctvc-site/,, No. JCTVC-L0178, Jan. 7, 2013 (Jan. 7, 2013), 3 Pages, XP030113666.
Boyce J., et al., "NAL unit header and parameter Set designs for HEVC extensions", 11. JCT-VC Meeting; 102. MPEG Meeting; Oct. 10, 2012-Oct. 19, 2012•, Shanghai; (Joint Collaborative Team on Video Coding of ISO/IEC JTC1/SC29/WG11 and ITU-T SG.16); URL: http://wftp3.itu.int/av-arch/jctvc-site/,, No. JCTVC-K1007, Oct. 19, 2012 (Oct. 19, 2012), 4 Pages, XP030113273.
Lee .K.-W., et al., "Signaling the dropping of reference slice for inter prediction after extracting the discardable layers", 20. JVT Meeting; 77, MPEG Meeting; Jul. 15, 2006-Jul. 21, 2006; Klagenfurt, AT; (Joint Video Team of ISO/IEC JTC1/SC29/WG11 and ITU-TSG.16 ),, No. JVT-T044, Jul. 16, 2006 (Jul. 16, 2006), 6 Pages, XP030006531, ISSN: 0000-0408.
Francois E., et al., "Proposal for CE10 Generic Extended Spatial SVC", 15. JVT Meeting; 72. MPEG Meeting; Apr. 16, 2005-Apr. 22, 2005; Busan, KR; (Joint Video Team of ISO/IEC JTC1/SC29/WG11 and ITU-T SG.16 ),, No. JVT-0041r1, Apr. 14, 2005 (Apr. 14, 2005), 18 Pages, XP030005987, ISSN: 0000-0417.
He Y., et al., "On base layer video output in SHVC", 13. JCT-VC Meeting; 104. MPEG Meeting; Apr. 18, 2013-Apr. 26, 2013; Incheon; (Joint Collaborative Team on Video Coding of ISO/IEC JTC1/SC29/WG11 and ITU-T SG.16); URL: http://wftp3.itu.int/av-arch/jctvc-site/,, No. JCTVC-M0180, Apr. 8, 2013 (Apr. 8, 2013), 1 Page, XP030114137.
International Search Report and Written Opinion—PCT/US2014/017321—ISA/EPO—May 14, 2014.
Rapaka K., et al., "Parallel Processing Indications for Tiles in HEVC Extensions", 13. JCT-VC Meeting; 104. MPEG Meeting; Apr. 18, 2013-Apr. 26, 2013; Incheon; (Joint Collaborative Team on Video Coding of ISO/IEC JTC1/SC29/WG11 and ITU-T SG.16); URL: http://wftp3.itu.int/av-arch/jctvc-site/,, No. JCTVC-M0334, Apr. 9, 2013 (Apr. 9, 2013), 2 Pages, XP030114291.
Wang Y.K., et al., "AHG9: On conformance-cropping-window-restricted inter-layer prediction", 13. JCT-VC Meeting; 104. MPEG Meeting; Apr. 18, 2013-Apr. 26, 2013; Incheon; (Joint Collaborative Team on Video Coding of ISO/IEC JTC1/SC29/WG11 and ITU-T SG.16); URL: http://wftp3.itu.int/av-arch/jctvc-site/,, No. JCTVC-M0274, Apr. 9, 2013 (Apr. 9, 2013), 2 Pages, XP030114231.
Bross, B., et al., High Efficiency Video Coding (HEVC) text specification draft 10 (for FDIS & Last Call), Joint Collaborative Team on Video Coding (JCT-VC) of ITU-T SG16 WP3 and ISO/IEC JTC1/SC29/WG11, 12th Meeting: Geneva, CH, Jan. 14-23, 2013, Document JCTVC-L1003_v34, 310 pp.

\* cited by examiner

DEVICE AND METHOD FOR SCALABLE CODING OF VIDEO INFORMATION

CROSS-REFERENCE TO RELATED APPLICATIONS

This application claims priority to U.S. Provisional No. 61/768,342, filed Feb. 22, 2013, which is hereby incorporated by reference in its entirety.

TECHNICAL FIELD

This disclosure relates to the field of video coding and compression, particularly to scalable video coding (SVC) or multiview video coding (MVC, 3DV).

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video compression techniques perform spatial (intra-picture) prediction and/or temporal (inter-picture) prediction to reduce or remove redundancy inherent in video sequences. For block-based video coding, a video slice (e.g., a video frame, a portion of a video frame, etc.) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy encoding may be applied to achieve even more compression.

SUMMARY

Scalable video coding (SVC) refers to video coding in which a base layer (BL), sometimes referred to as a reference layer (RL), and one or more scalable enhancement layers (ELs) are used. In SVC, the base layer can carry video data with a base level of quality. The one or more enhancement layers can carry additional video data to support, for example, higher spatial, temporal, and/or signal-to-noise (SNR) levels. Enhancement layers may be defined relative to a previously encoded layer. For example, a bottom layer may serve as a BL, while a top layer may serve as an EL. Middle layers may serve as either ELs or RLs, or both. For example, a layer in the middle may be an EL for the layers below it, such as the base layer or any intervening enhancement layers, and at the same time serve as a RL for one or more enhancement layers above it. Similarly, in the Multiview or 3D extension of the HEVC standard, there may be multiple views, and information of one view may be utilized to code (e.g., encode or decode) the information of another view (e.g., motion estimation, motion vector prediction and/or other redundancies).

In SVC, a current block in the enhancement layer may be predicted using the information of a corresponding block (e.g., a block corresponding to the same portion of the picture as the current block) in the base layer. For example, texture information (e.g., pixel or sample values) or syntax information (e.g., motion information such as motion vectors or mode information such as intra mode) of the current block may be based on the corresponding block in the base layer.

However, the corresponding block of the base layer may be located outside of the base layer frame, for example, when the coded frame size is bigger than the actual frame size that might be displayed on a device, or when the base layer is coded with another video standard (e.g., the enhancement layer is HEVC compatible, but the base layer is not). In such situations, the information of the portions of the base layer that is outside of the cropped picture (e.g., base layer picture cropped according to the display dimensions or conformance cropping window) may not be available for predicting the current block in the enhancement layer.

One way to deal with such unavailability of base layer information is to disallow the use of any information outside of the cropped picture (e.g., outside of the conformance cropping window). However, in some cases, the information outside of the cropped picture may be available (e.g., the enhancement layer and the base layer both follow the HEVC design). In such cases, disallowing the use of the information outside of the cropped picture entirely may result in reduced coding efficiency. Thus, by selectively enabling the use of the information outside of the cropped picture (e.g., only when the base layer is coded by a codec that conforms to the HEVC), coding efficiency may be improved.

The systems, methods and devices of this disclosure each have several innovative aspects, no single one of which is solely responsible for the desirable attributes disclosed herein.

In one embodiment, an apparatus configured to code (e.g., encode or decode) video information includes a memory unit and a processor in communication with the memory unit. The memory unit is configured to store video information associated with a reference layer (RL) and an enhancement layer, the RL comprising an RL picture having an output region that includes a portion of the RL picture. The processor is configured to determine whether a condition indicates that information outside of the output region is available to predict a current block in the enhancement layer.

In one embodiment, a method of coding (e.g., encoding or decoding) video information comprises storing video information associated with a reference layer (RL) and an enhancement layer, the RL comprising an RL picture having an output region that includes a portion of the RL picture; and determining whether a condition indicates that information outside of the output region is available to predict a current block in the enhancement layer.

In one embodiment, a non-transitory computer readable medium comprises code that, when executed, causes an apparatus to perform a process. The process includes storing video information associated with a reference layer (RL) and an enhancement layer, the RL comprising an RL picture having an output region that includes a portion of the RL picture; and determining whether a condition indicates that information outside of the output region is available to predict a current block in the enhancement layer.

In one embodiment, a video coding device configured to code video information comprises means for storing video information associated with a reference layer (RL) and an enhancement layer, the RL comprising an RL picture having an output region that includes a portion of the RL picture; and means for determining whether a condition indicates that information outside of the output region is available to predict a current block in the enhancement layer.

DETAILED DESCRIPTION

Figure 1:
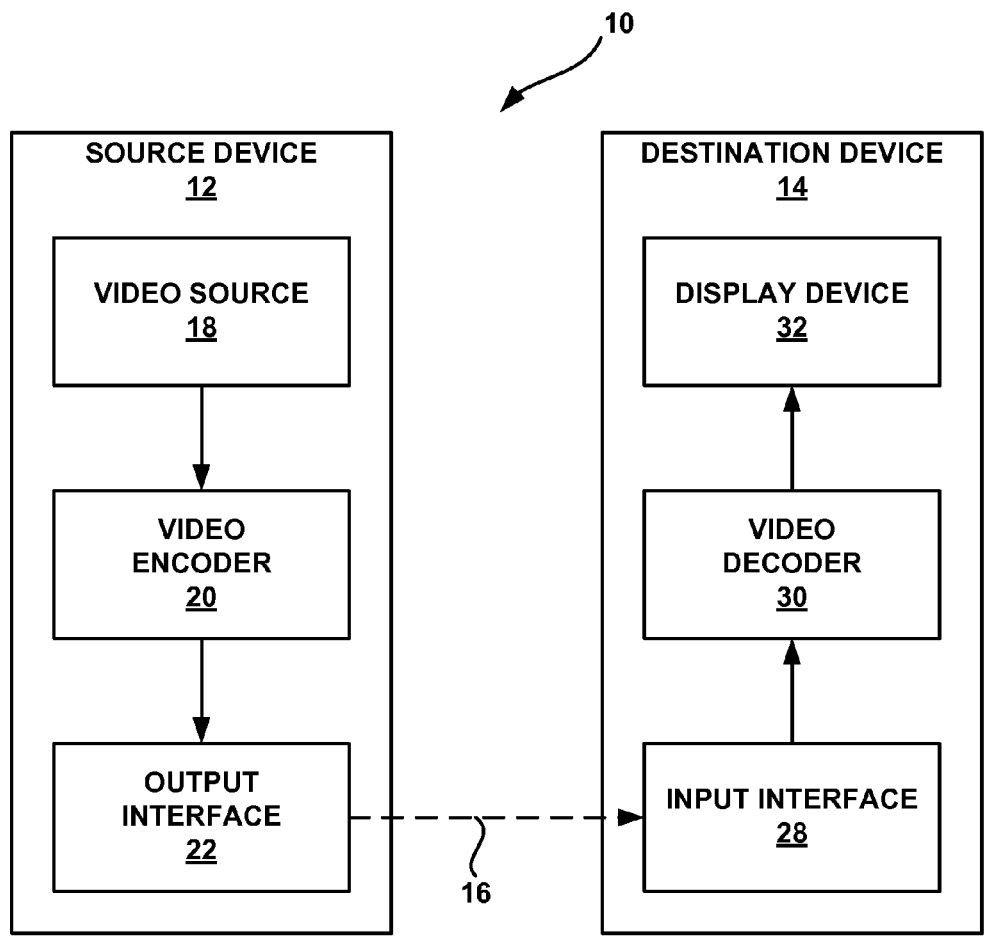
FIG. 1 is a block diagram illustrating an example of a video encoding and decoding system that may utilize techniques in accordance with aspects described in this disclosure.

Certain embodiments described herein relate to inter-layer prediction for scalable video coding in the context of advanced video codecs, such as HEVC (High Efficiency Video Coding). More specifically, the present disclosure relates to systems and methods for improved performance of inter-layer prediction in scalable video coding (SVC) extension of HEVC.

In the description below, H.264/AVC techniques related to certain embodiments are described; the HEVC standard and related techniques are also discussed. While certain embodiments are described herein in the context of the HEVC and/or H.264 standards, one having ordinary skill in the art may appreciate that systems and methods disclosed herein may be applicable to any suitable video coding standard. For example, embodiments disclosed herein may be applicable to one or more of the following standards: ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions.

HEVC generally follows the framework of previous video coding standards in many respects. The unit of prediction in HEVC is different from that in certain previous video coding standards (e.g., macroblock). In fact, the concept of macroblock does not exist in HEVC as understood in certain previous video coding standards. Macroblock is replaced by a hierarchical structure based on a quadtree scheme, which may provide high flexibility, among other possible benefits. For example, within the HEVC scheme, three types of blocks, Coding Unit (CU), Prediction Unit (PU), and Transform Unit (TU), are defined. CU may refer to the basic unit of region splitting. CU may be considered analogous to the concept of macroblock, but it does not restrict the maximum size and may allow recursive splitting into four equal size CUs to improve the content adaptivity. PU may be considered the basic unit of inter/intra prediction and it may contain multiple arbitrary shape partitions in a single PU to effectively code irregular image patterns. TU may be considered the basic unit of transform. It can be defined independently from the PU; however, its size may be limited to the CU to which the TU belongs. This separation of the block structure into three different concepts may allow each to be optimized according to its role, which may result in improved coding efficiency.

For purposes of illustration only, certain embodiments disclosed herein are described with examples including only two layers (e.g., lower level layer such as the base layer, and a higher level layer such as the enhancement layer). It should be understood that such examples may be applicable to configurations including multiple base and/or enhancement layers. In addition, for ease of explanation, the following disclosure includes the terms "frames" or "blocks" with reference to certain embodiments. However, these terms are not meant to be limiting. For example, the techniques described below can be used with any suitable video units, such as blocks (e.g., CU, PU, TU, macroblocks, etc.), slices, frames, etc.

Video Coding Standards

A digital image, such as a video image, a TV image, a still image or an image generated by a video recorder or a computer, may consist of pixels or samples arranged in horizontal and vertical lines. The number of pixels in a single image is typically in the tens of thousands. Each pixel typically contains luminance and chrominance information. Without compression, the quantity of information to be conveyed from an image encoder to an image decoder is so enormous that it renders real-time image transmission impossible. To reduce the amount of information to be transmitted, a number of different compression methods, such as JPEG, MPEG and H.263 standards, have been developed.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, a new video coding standard, namely High Efficiency Video Coding (HEVC), is being developed by the Joint Collaboration Team on Video Coding (JCT-VC) of ITU-T Video Coding Experts Group (VCEG) and ISO/IEC Motion Picture Experts Group (MPEG). The full citation for the HEVC Draft 10 is document JCTVC-L1003, Bross et al., "High Efficiency Video Coding (HEVC) Text Specification Draft 10," Joint Collaborative Team on Video Coding (JCT-VC) of ITU-T SG16 WP3 and ISO/IEC JTC1/SC29/WG11, 12th Meeting: Geneva, Switzerland, Jan. 14, 2013 to Jan. 23, 2013.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the present disclosure. For example, an apparatus may be implemented or a method may be practiced using any number of the aspects set forth herein. In addition, the scope of the present disclosure is intended to cover such an apparatus or method which is practiced using other structure, functionality, or structure and functionality in addition to or other than the various aspects of the present disclosure set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The attached drawings illustrate examples. Elements indicated by reference numbers in the attached drawings correspond to elements indicated by like reference numbers in the following description. In this disclosure, elements having names that start with ordinal words (e.g., "first," "second," "third," and so on) do not necessarily imply that the elements have a particular order. Rather, such ordinal words are merely used to refer to different elements of a same or similar type.

Video Coding System

FIG. 1 is a block diagram that illustrates an example video coding system 10 that may utilize techniques in accordance with aspects described in this disclosure. As used described herein, the term "video coder" refers generically to both video encoders and video decoders. In this disclosure, the terms "video coding" or "coding" may refer generically to video encoding and video decoding.

As shown in FIG. 1, video coding system 10 includes a source device 12 and a destination device 14. Source device 12 generates encoded video data. Destination device 14 may decode the encoded video data generated by source device 12. Source device 12 and destination device 14 may comprise a wide range of devices, including desktop computers, notebook (e.g., laptop, etc.) computers, tablet computers, set-top boxes, telephone handsets such as so-called "smart" phones, so-called "smart" pads, televisions, cameras, display devices, digital media players, video gaming consoles, in-car computers, or the like. In some examples, source device 12 and destination device 14 may be equipped for wireless communication.

Destination device 14 may receive encoded video data from source device 12 via a channel 16. Channel 16 may comprise any type of medium or device capable of moving the encoded video data from source device 12 to destination device 14. In one example, channel 16 may comprise a communication medium that enables source device 12 to transmit encoded video data directly to destination device 14 in real-time. In this example, source device 12 may modulate the encoded video data according to a communication standard, such as a wireless communication protocol, and may transmit the modulated video data to destination device 14. The communication medium may comprise a wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or other equipment that facilitates communication from source device 12 to destination device 14.

In another example, channel 16 may correspond to a storage medium that stores the encoded video data generated by source device 12. In this example, destination device 14 may access the storage medium via disk access or card access. The storage medium may include a variety of locally accessed data storage media such as Blu-ray discs, DVDs, CD-ROMs, flash memory, or other suitable digital storage media for storing encoded video data. In a further example, channel 16 may include a file server or another intermediate storage device that stores the encoded video generated by source device 12. In this example, destination device 14 may access encoded video data stored at the file server or other intermediate storage device via streaming or download. The file server may be a type of server capable of storing encoded video data and transmitting the encoded video data to destination device 14. Example file servers include web servers (e.g., for a website, etc.), FTP servers, network attached storage (NAS) devices, and local disk drives. Destination device 14 may access the encoded video data through any standard data connection, including an Internet connection. Example types of data connections may include wireless channels (e.g., Wi-Fi connections, etc.), wired connections (e.g., DSL, cable modem, etc.), or combinations of both that are suitable for accessing encoded video data stored on a file server. The transmission of encoded video data from the file server may be a streaming transmission, a download transmission, or a combination of both.

The techniques of this disclosure are not limited to wireless applications or settings. The techniques may be applied to video coding in support of any of a variety of multimedia applications, such as over-the-air television broadcasts, cable television transmissions, satellite television transmissions, streaming video transmissions, e.g., via the Internet (e.g., dynamic adaptive streaming over HTTP (DASH), etc.), encoding of digital video for storage on a data storage medium, decoding of digital video stored on a data storage medium, or other applications. In some examples, video coding system 10 may be configured to support one-way or two-way video transmission to support applications such as video streaming, video playback, video broadcasting, and/or video telephony.

In the example of FIG. 1, source device 12 includes a video source 18, video encoder 20, and an output interface 22. In some cases, output interface 22 may include a modulator/demodulator (modem) and/or a transmitter. In source device 12, video source 18 may include a source such as a video capture device, e.g., a video camera, a video archive containing previously captured video data, a video feed interface to receive video data from a video content provider, and/or a computer graphics system for generating video data, or a combination of such sources.

Video encoder 20 may be configured to encode the captured, pre-captured, or computer-generated video data. The encoded video data may be transmitted directly to destination device 14 via output interface 22 of source device 12. The encoded video data may also be stored onto a storage medium or a file server for later access by destination device 14 for decoding and/or playback.

In the example of FIG. 1, destination device 14 includes an input interface 28, a video decoder 30, and a display device 32. In some cases, input interface 28 may include a receiver and/or a modem. Input interface 28 of destination device 14 receives encoded video data over channel 16. The encoded video data may include a variety of syntax elements generated by video encoder 20 that represent the video data. The syntax elements may describe characteristics and/or processing of blocks and other coded units, e.g., groups of pictures (GOPs). Such syntax elements may be included with the encoded video data transmitted on a communication medium, stored on a storage medium, or stored a file server.

Display device 32 may be integrated with or may be external to destination device 14. In some examples, destination device 14 may include an integrated display device and may also be configured to interface with an external display device. In other examples, destination device 14 may be a display device. In general, display device 32 displays the decoded video data to a user. Display device 32 may comprise any of a variety of display devices such as a liquid crystal display (LCD), a plasma display, an organic light emitting diode (OLED) display, or another type of display device.

Video encoder 20 and video decoder 30 may operate according to a video compression standard, such as the High Efficiency Video Coding (HEVC) standard presently under development, and may conform to a HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard. Other examples of video compression standards include MPEG-2 and ITU-T H.263.

Although not shown in the example of FIG. 1, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, in some examples, MUX-DEMUX units may conform to the ITU H.223 multiplexer protocol, or other protocols such as the user datagram protocol (UDP).

Again, FIG. 1 is merely an example and the techniques of this disclosure may apply to video coding settings (e.g., video encoding or video decoding) that do not necessarily include any data communication between the encoding and decoding devices. In other examples, data can be retrieved from a local memory, streamed over a network, or the like. An encoding device may encode and store data to memory, and/or a decoding device may retrieve and decode data from memory. In many examples, the encoding and decoding is performed by devices that do not communicate with one another, but simply encode data to memory and/or retrieve and decode data from memory.

Video encoder 20 and video decoder 30 each may be implemented as any of a variety of suitable circuitry, such as one or more microprocessors, digital signal processors (DSPs), application specific integrated circuits (ASICs), field programmable gate arrays (FPGAs), discrete logic, hardware, or any combinations thereof. When the techniques are implemented partially in software, a device may store instructions for the software in a suitable, non-transitory computer-readable storage medium and may execute the instructions in hardware using one or more processors to perform the techniques of this disclosure. Although video encoder 20 and video decoder 30 are shown as being implemented in separate devices in the example of FIG. 1, the present disclosure is not limited to such configuration, and video encoder 20 and video decoder 30 may be implemented in the same device. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

As mentioned briefly above, video encoder 20 encodes video data. The video data may comprise one or more pictures. Each of the pictures is a still image forming part of a video. In some instances, a picture may be referred to as a video "frame." When video encoder 20 encodes the video data, video encoder 20 may generate a bitstream. The bitstream may include a sequence of bits that form a coded representation of the video data. The bitstream may include coded pictures and associated data. A coded picture is a coded representation of a picture.

To generate the bitstream, video encoder 20 may perform encoding operations on each picture in the video data. When video encoder 20 performs encoding operations on the pictures, video encoder 20 may generate a series of coded pictures and associated data. The associated data may include video parameter sets (VPS), sequence parameter sets, picture parameter sets, adaptation parameter sets, and other syntax structures. A sequence parameter set (SPS) may contain parameters applicable to zero or more sequences of pictures. A picture parameter set (PPS) may contain parameters applicable to zero or more pictures. An adaptation parameter set (APS) may contain parameters applicable to zero or more pictures. Parameters in an APS may be parameters that are more likely to change than parameters in a PPS.

To generate a coded picture, video encoder 20 may partition a picture into equally-sized video blocks. A video block may be a two-dimensional array of samples. Each of the video blocks is associated with a treeblock. In some instances, a treeblock may be referred to as a largest coding unit (LCU). The treeblocks of HEVC may be broadly analogous to the macroblocks of previous standards, such as H.264/AVC. However, a treeblock is not necessarily limited to a particular size and may include one or more coding units (CUs). Video encoder 20 may use quadtree partitioning to partition the video blocks of treeblocks into video blocks associated with CUs, hence the name "treeblocks."

In some examples, video encoder 20 may partition a picture into a plurality of slices. Each of the slices may include an integer number of CUs. In some instances, a slice comprises an integer number of treeblocks. In other instances, a boundary of a slice may be within a treeblock.

As part of performing an encoding operation on a picture, video encoder 20 may perform encoding operations on each slice of the picture. When video encoder 20 performs an encoding operation on a slice, video encoder 20 may generate encoded data associated with the slice. The encoded data associated with the slice may be referred to as a "coded slice."

To generate a coded slice, video encoder 20 may perform encoding operations on each treeblock in a slice. When video encoder 20 performs an encoding operation on a treeblock, video encoder 20 may generate a coded treeblock. The coded treeblock may comprise data representing an encoded version of the treeblock.

When video encoder 20 generates a coded slice, video encoder 20 may perform encoding operations on (e.g., encode) the treeblocks in the slice according to a raster scan order. For example, video encoder 20 may encode the treeblocks of the slice in an order that proceeds from left to right across a topmost row of treeblocks in the slice, then from left to right across a next lower row of treeblocks, and so on until video encoder 20 has encoded each of the treeblocks in the slice.

As a result of encoding the treeblocks according to the raster scan order, the treeblocks above and to the left of a given treeblock may have been encoded, but treeblocks below and to the right of the given treeblock have not yet been encoded. Consequently, video encoder 20 may be able to access information generated by encoding treeblocks above and to the left of the given treeblock when encoding the given treeblock. However, video encoder 20 may be unable to access information generated by encoding treeblocks below and to the right of the given treeblock when encoding the given treeblock.

To generate a coded treeblock, video encoder 20 may recursively perform quadtree partitioning on the video block of the treeblock to divide the video block into progressively smaller video blocks. Each of the smaller video blocks may be associated with a different CU. For example, video encoder 20 may partition the video block of a treeblock into four equally-sized sub-blocks, partition one or more of the sub-blocks into four equally-sized sub-sub-blocks, and so on. A partitioned CU may be a CU whose video block is partitioned into video blocks associated with other CUs. A non-partitioned CU may be a CU whose video block is not partitioned into video blocks associated with other CUs.

One or more syntax elements in the bitstream may indicate a maximum number of times video encoder 20 may partition the video block of a treeblock. A video block of a CU may be square in shape. The size of the video block of a CU (e.g., the size of the CU) may range from 8×8 pixels up to the size of a video block of a treeblock (e.g., the size of the treeblock) with a maximum of 64×64 pixels or greater.

Video encoder 20 may perform encoding operations on (e.g., encode) each CU of a treeblock according to a z-scan order. In other words, video encoder 20 may encode a top-left CU, a top-right CU, a bottom-left CU, and then a bottom-right CU, in that order. When video encoder 20 performs an encoding operation on a partitioned CU, video encoder 20 may encode CUs associated with sub-blocks of the video block of the partitioned CU according to the z-scan order. In other words, video encoder 20 may encode a CU associated with a top-left sub-block, a CU associated with a top-right sub-block, a CU associated with a bottom-left sub-block, and then a CU associated with a bottom-right sub-block, in that order.

As a result of encoding the CUs of a treeblock according to a z-scan order, the CUs above, above-and-to-the-left, above-and-to-the-right, left, and below-and-to-the left of a given CU may have been encoded. CUs below and to the right of the given CU have not yet been encoded. Consequently, video encoder 20 may be able to access information generated by encoding some CUs that neighbor the given CU when encoding the given CU. However, video encoder 20 may be unable to access information generated by encoding other CUs that neighbor the given CU when encoding the given CU.

When video encoder 20 encodes a non-partitioned CU, video encoder 20 may generate one or more prediction units (PUs) for the CU. Each of the PUs of the CU may be associated with a different video block within the video block of the CU. Video encoder 20 may generate a predicted video block for each PU of the CU. The predicted video block of a PU may be a block of samples. Video encoder 20 may use intra prediction or inter prediction to generate the predicted video block for a PU.

When video encoder 20 uses intra prediction to generate the predicted video block of a PU, video encoder 20 may generate the predicted video block of the PU based on decoded samples of the picture associated with the PU. If video encoder 20 uses intra prediction to generate predicted video blocks of the PUs of a CU, the CU is an intra-predicted CU. When video encoder 20 uses inter prediction to generate the predicted video block of the PU, video encoder 20 may generate the predicted video block of the PU based on decoded samples of one or more pictures other than the picture associated with the PU. If video encoder 20 uses inter prediction to generate predicted video blocks of the PUs of a CU, the CU is an inter-predicted CU.

Furthermore, when video encoder 20 uses inter prediction to generate a predicted video block for a PU, video encoder 20 may generate motion information for the PU. The motion information for a PU may indicate one or more reference blocks of the PU. Each reference block of the PU may be a video block within a reference picture. The reference picture may be a picture other than the picture associated with the PU. In some instances, a reference block of a PU may also be referred to as the "reference sample" of the PU. Video encoder 20 may generate the predicted video block for the PU based on the reference blocks of the PU.

After video encoder 20 generates predicted video blocks for one or more PUs of a CU, video encoder 20 may generate residual data for the CU based on the predicted video blocks for the PUs of the CU. The residual data for the CU may indicate differences between samples in the predicted video blocks for the PUs of the CU and the original video block of the CU.

Furthermore, as part of performing an encoding operation on a non-partitioned CU, video encoder 20 may perform recursive quadtree partitioning on the residual data of the CU to partition the residual data of the CU into one or more blocks of residual data (e.g., residual video blocks) associated with transform units (TUs) of the CU. Each TU of a CU may be associated with a different residual video block.

Video coder 20 may apply one or more transforms to residual video blocks associated with the TUs to generate transform coefficient blocks (e.g., blocks of transform coefficients) associated with the TUs. Conceptually, a transform coefficient block may be a two-dimensional (2D) matrix of transform coefficients.

After generating a transform coefficient block, video encoder 20 may perform a quantization process on the transform coefficient block. Quantization generally refers to a process in which transform coefficients are quantized to possibly reduce the amount of data used to represent the transform coefficients, providing further compression. The quantization process may reduce the bit depth associated with some or all of the transform coefficients. For example, an n-bit transform coefficient may be rounded down to an m-bit transform coefficient during quantization, where n is greater than m.

Video encoder 20 may associate each CU with a quantization parameter (QP) value. The QP value associated with a CU may determine how video encoder 20 quantizes transform coefficient blocks associated with the CU. Video encoder 20 may adjust the degree of quantization applied to the transform coefficient blocks associated with a CU by adjusting the QP value associated with the CU.

After video encoder 20 quantizes a transform coefficient block, video encoder 20 may generate sets of syntax elements that represent the transform coefficients in the quantized transform coefficient block. Video encoder 20 may apply entropy encoding operations, such as Context Adaptive Binary Arithmetic Coding (CABAC) operations, to some of these syntax elements. Other entropy coding techniques such as content adaptive variable length coding (CAVLC), probability interval partitioning entropy (PIPE) coding, or other binary arithmetic coding could also be used.

The bitstream generated by video encoder 20 may include a series of Network Abstraction Layer (NAL) units. Each of the NAL units may be a syntax structure containing an indication of a type of data in the NAL unit and bytes containing the data. For example, a NAL unit may contain data representing a video parameter set, a sequence parameter set, a picture parameter set, a coded slice, supplemental enhancement information (SEI), an access unit delimiter, filler data, or another type of data. The data in a NAL unit may include various syntax structures.

Video decoder 30 may receive the bitstream generated by video encoder 20. The bitstream may include a coded representation of the video data encoded by video encoder 20. When video decoder 30 receives the bitstream, video decoder 30 may perform a parsing operation on the bitstream. When video decoder 30 performs the parsing operation, video decoder 30 may extract syntax elements from the bitstream. Video decoder 30 may reconstruct the pictures of the video data based on the syntax elements extracted from the bitstream. The process to reconstruct the video data based on the syntax elements may be generally reciprocal to the process performed by video encoder 20 to generate the syntax elements.

After video decoder 30 extracts the syntax elements associated with a CU, video decoder 30 may generate predicted video blocks for the PUs of the CU based on the syntax elements. In addition, video decoder 30 may inverse quantize transform coefficient blocks associated with TUs of the CU. Video decoder 30 may perform inverse transforms on the transform coefficient blocks to reconstruct residual video blocks associated with the TUs of the CU. After generating the predicted video blocks and reconstructing the residual video blocks, video decoder 30 may reconstruct the video block of the CU based on the predicted video blocks and the residual video blocks. In this way, video decoder 30 may reconstruct the video blocks of CUs based on the syntax elements in the bitstream.

Video Encoder

Figure 2:
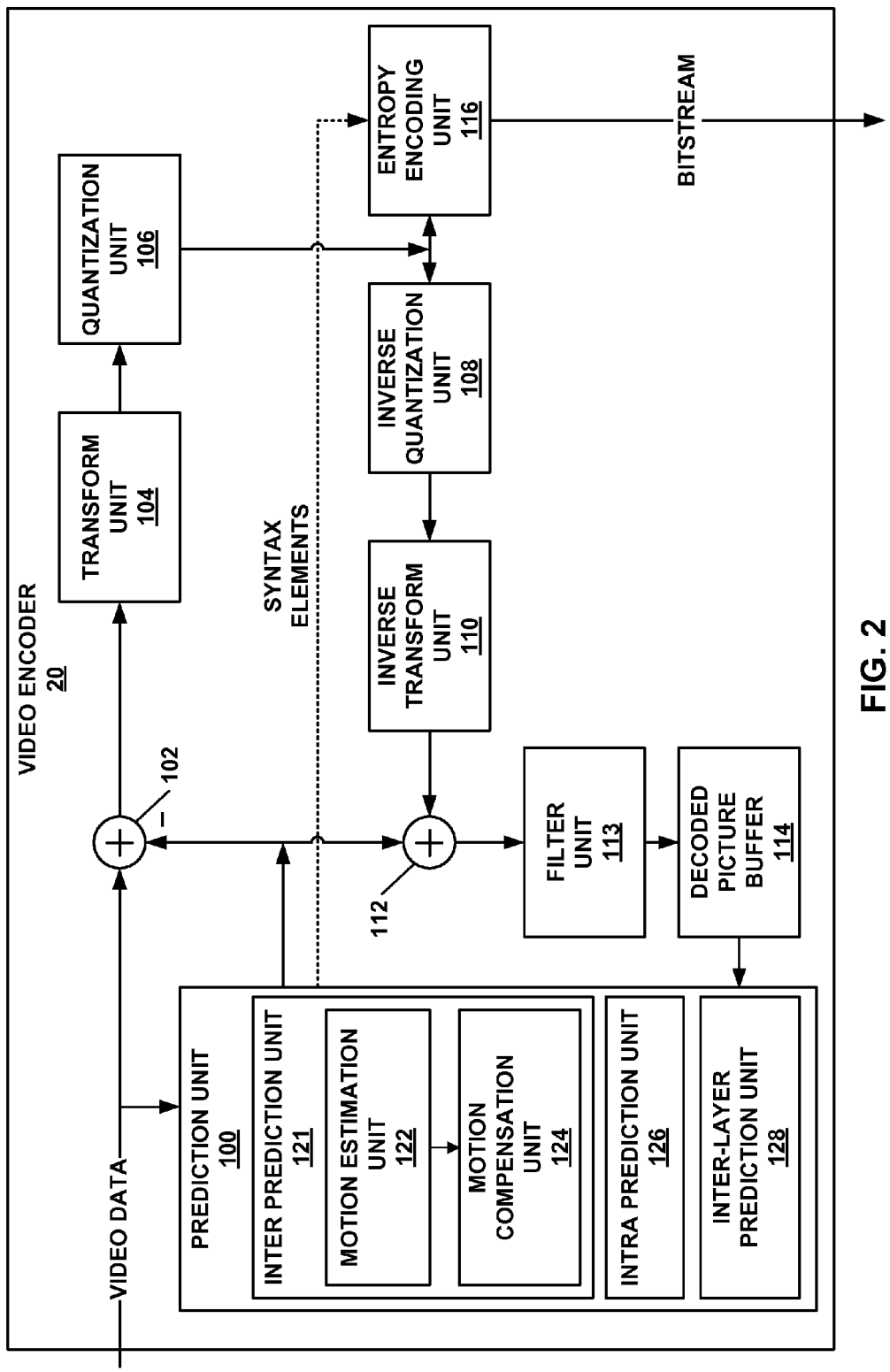
FIG. 2 is a block diagram illustrating an example of a video encoder that may implement techniques in accordance with aspects described in this disclosure.

FIG. 2 is a block diagram illustrating an example of a video encoder that may implement techniques in accordance with aspects described in this disclosure. Video encoder 20 may be configured to perform any or all of the techniques of this disclosure. As one example, prediction unit 100 may be configured to perform any or all of the techniques described in this disclosure. In another embodiment, the video encoder 20 includes an optional inter-layer prediction unit 128 that is configured to perform any or all of the techniques described in this disclosure. In other embodiments, inter-layer prediction can be performed by prediction unit 100 (e.g., inter prediction unit 121 and/or intra prediction unit 126), in which case the inter-layer prediction unit 128 may be omitted. However, aspects of this disclosure are not so limited. In some examples, the techniques described in this disclosure may be shared among the various components of video encoder 20. In some examples, in addition to or instead of, a processor (not shown) may be configured to perform any or all of the techniques described in this disclosure.

For purposes of explanation, this disclosure describes video encoder 20 in the context of HEVC coding. However, the techniques of this disclosure may be applicable to other coding standards or methods.

Video encoder 20 may perform intra- and inter-coding of video blocks within video slices. Intra coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-directional prediction (B mode), may refer to any of several temporal-based coding modes.

In the example of FIG. 2, video encoder 20 includes a plurality of functional components. The functional components of video encoder 20 include a prediction unit 100, a residual generation unit 102, a transform unit 104, a quantization unit 106, an inverse quantization unit 108, an inverse transform unit 110, a reconstruction unit 112, a filter unit 113, a decoded picture buffer 114, and an entropy encoding unit 116. Prediction unit 100 includes an inter prediction unit 121, a motion estimation unit 122, a motion compensation unit 124, an intra prediction unit 126, and an inter-layer prediction unit 128. In other examples, video encoder 20 may include more, fewer, or different functional components. Furthermore, motion estimation unit 122 and motion compensation unit 124 may be highly integrated, but are represented in the example of FIG. 2 separately for purposes of explanation.

Video encoder 20 may receive video data. Video encoder 20 may receive the video data from various sources. For example, video encoder 20 may receive the video data from video source 18 (FIG. 1) or another source. The video data may represent a series of pictures. To encode the video data, video encoder 20 may perform an encoding operation on each of the pictures. As part of performing the encoding operation on a picture, video encoder 20 may perform encoding operations on each slice of the picture. As part of performing an encoding operation on a slice, video encoder 20 may perform encoding operations on treeblocks in the slice.

As part of performing an encoding operation on a treeblock, prediction unit 100 may perform quadtree partitioning on the video block of the treeblock to divide the video block into progressively smaller video blocks. Each of the smaller video blocks may be associated with a different CU. For example, prediction unit 100 may partition a video block of a treeblock into four equally-sized sub-blocks, partition one or more of the sub-blocks into four equally-sized sub-sub-blocks, and so on.

The sizes of the video blocks associated with CUs may range from 8×8 samples up to the size of the treeblock with a maximum of 64×64 samples or greater. In this disclosure, "N×N" and "N by N" may be used interchangeably to refer to the sample dimensions of a video block in terms of vertical and horizontal dimensions, e.g., 16×16 samples or 16 by 16 samples. In general, a 16×16 video block has sixteen samples in a vertical direction (y=16) and sixteen samples in a horizontal direction (x=16). Likewise, an N×N block generally has N samples in a vertical direction and N samples in a horizontal direction, where N represents a nonnegative integer value.

Furthermore, as part of performing the encoding operation on a treeblock, prediction unit 100 may generate a hierarchical quadtree data structure for the treeblock. For example, a treeblock may correspond to a root node of the quadtree data structure. If prediction unit 100 partitions the video block of the treeblock into four sub-blocks, the root node has four child nodes in the quadtree data structure. Each of the child nodes corresponds to a CU associated with one of the sub-blocks. If prediction unit 100 partitions one of the sub-blocks into four sub-sub-blocks, the node corresponding to the CU associated with the sub-block may have four child nodes, each of which corresponds to a CU associated with one of the sub-sub-blocks.

Each node of the quadtree data structure may contain syntax data (e.g., syntax elements) for the corresponding treeblock or CU. For example, a node in the quadtree may include a split flag that indicates whether the video block of the CU corresponding to the node is partitioned (e.g., split) into four sub-blocks. Syntax elements for a CU may be defined recursively, and may depend on whether the video block of the CU is split into sub-blocks. A CU whose video block is not partitioned may correspond to a leaf node in the quadtree data structure. A coded treeblock may include data based on the quadtree data structure for a corresponding treeblock.

Video encoder 20 may perform encoding operations on each non-partitioned CU of a treeblock. When video encoder 20 performs an encoding operation on a non-partitioned CU, video encoder 20 generates data representing an encoded representation of the non-partitioned CU.

As part of performing an encoding operation on a CU, prediction unit 100 may partition the video block of the CU among one or more PUs of the CU. Video encoder 20 and video decoder 30 may support various PU sizes. Assuming that the size of a particular CU is 2N×2N, video encoder 20 and video decoder 30 may support PU sizes of 2N×2N or N×N, and inter-prediction in symmetric PU sizes of 2N×2N, 2N×N, N×2N, N×N, 2N×nU, nL×2N, nR×2N, or similar. Video encoder 20 and video decoder 30 may also support asymmetric partitioning for PU sizes of 2N×nU, 2N×nD, nL×2N, and nR×2N. In some examples, prediction unit 100 may perform geometric partitioning to partition the video block of a CU among PUs of the CU along a boundary that does not meet the sides of the video block of the CU at right angles.

Inter prediction unit 121 may perform inter prediction on each PU of the CU. Inter prediction may provide temporal compression. To perform inter prediction on a PU, motion estimation unit 122 may generate motion information for the PU. Motion compensation unit 124 may generate a predicted video block for the PU based the motion information and decoded samples of pictures other than the picture associated with the CU (e.g., reference pictures). In this disclosure, a predicted video block generated by motion compensation unit 124 may be referred to as an inter-predicted video block.

Slices may be I slices, P slices, or B slices. Motion estimation unit 122 and motion compensation unit 124 may perform different operations for a PU of a CU depending on whether the PU is in an I slice, a P slice, or a B slice. In an I slice, all PUs are intra predicted. Hence, if the PU is in an I slice, motion estimation unit 122 and motion compensation unit 124 do not perform inter prediction on the PU.

If the PU is in a P slice, the picture containing the PU is associated with a list of reference pictures referred to as "list 0." Each of the reference pictures in list 0 contains samples that may be used for inter prediction of other pictures. When motion estimation unit 122 performs the motion estimation operation with regard to a PU in a P slice, motion estimation unit 122 may search the reference pictures in list 0 for a reference block for the PU. The reference block of the PU may be a set of samples, e.g., a block of samples, that most closely corresponds to the samples in the video block of the PU. Motion estimation unit 122 may use a variety of metrics to determine how closely a set of samples in a reference picture corresponds to the samples in the video block of a PU. For example, motion estimation unit 122 may determine how closely a set of samples in a reference picture corresponds to the samples in the video block of a PU by sum of absolute difference (SAD), sum of square difference (SSD), or other difference metrics.

After identifying a reference block of a PU in a P slice, motion estimation unit 122 may generate a reference index that indicates the reference picture in list 0 containing the reference block and a motion vector that indicates a spatial displacement between the PU and the reference block. In various examples, motion estimation unit 122 may generate motion vectors to varying degrees of precision. For example, motion estimation unit 122 may generate motion vectors at one-quarter sample precision, one-eighth sample precision, or other fractional sample precision. In the case of fractional sample precision, reference block values may be interpolated from integer-position sample values in the reference picture. Motion estimation unit 122 may output the reference index and the motion vector as the motion information of the PU. Motion compensation unit 124 may generate a predicted video block of the PU based on the reference block identified by the motion information of the PU.

If the PU is in a B slice, the picture containing the PU may be associated with two lists of reference pictures, referred to as "list 0" and "list 1." In some examples, a picture containing a B slice may be associated with a list combination that is a combination of list 0 and list 1.

Furthermore, if the PU is in a B slice, motion estimation unit 122 may perform uni-directional prediction or bi-directional prediction for the PU. When motion estimation unit 122 performs uni-directional prediction for the PU, motion estimation unit 122 may search the reference pictures of list 0 or list 1 for a reference block for the PU. Motion estimation unit 122 may then generate a reference index that indicates the reference picture in list 0 or list 1 that contains the reference block and a motion vector that indicates a spatial displacement between the PU and the reference block. Motion estimation unit 122 may output the reference index, a prediction direction indicator, and the motion vector as the motion information of the PU. The prediction direction indicator may indicate whether the reference index indicates a reference picture in list 0 or list 1. Motion compensation unit 124 may generate the predicted video block of the PU based on the reference block indicated by the motion information of the PU.

When motion estimation unit 122 performs bi-directional prediction for a PU, motion estimation unit 122 may search the reference pictures in list 0 for a reference block for the PU and may also search the reference pictures in list 1 for another reference block for the PU. Motion estimation unit 122 may then generate reference indexes that indicate the reference pictures in list 0 and list 1 containing the reference blocks and motion vectors that indicate spatial displacements between the reference blocks and the PU. Motion estimation unit 122 may output the reference indexes and the motion vectors of the PU as the motion information of the PU. Motion compensation unit 124 may generate the predicted video block of the PU based on the reference blocks indicated by the motion information of the PU.

In some instances, motion estimation unit 122 does not output a full set of motion information for a PU to entropy encoding unit 116. Rather, motion estimation unit 122 may signal the motion information of a PU with reference to the motion information of another PU. For example, motion estimation unit 122 may determine that the motion information of the PU is sufficiently similar to the motion information of a neighboring PU. In this example, motion estimation unit 122 may indicate, in a syntax structure associated with the PU, a value that indicates to video decoder 30 that the PU has the same motion information as the neighboring PU. In another example, motion estimation unit 122 may identify, in a syntax structure associated with the PU, a neighboring PU and a motion vector difference (MVD). The motion vector difference indicates a difference between the motion vector of the PU and the motion vector of the indicated neighboring PU. Video decoder 30 may use the motion vector of the indicated neighboring PU and the motion vector difference to determine the motion vector of the PU. By referring to the motion information of a first PU when signaling the motion information of a second PU, video encoder 20 may be able to signal the motion information of the second PU using fewer bits.

As further discussed below with reference to FIGS. 5 and 6, the prediction unit 100 may be configured to code (e.g., encode or decode) the PU (or any other enhancement layer blocks or video units) by performing the methods illustrated in FIGS. 5 and 6. For example, inter prediction unit 121 (e.g., via motion estimation unit 122 and/or motion compensation unit 124), intra prediction unit 126, or inter-layer prediction unit 128 may be configured to perform the methods illustrated in FIGS. 5 and 6, either together or separately.

As part of performing an encoding operation on a CU, intra prediction unit 126 may perform intra prediction on PUs of the CU. Intra prediction may provide spatial compression. When intra prediction unit 126 performs intra prediction on a PU, intra prediction unit 126 may generate prediction data for the PU based on decoded samples of other PUs in the same picture. The prediction data for the PU may include a predicted video block and various syntax elements. Intra prediction unit 126 may perform intra prediction on PUs in I slices, P slices, and B slices.

To perform intra prediction on a PU, intra prediction unit 126 may use multiple intra prediction modes to generate multiple sets of prediction data for the PU. When intra prediction unit 126 uses an intra prediction mode to generate a set of prediction data for the PU, intra prediction unit 126 may extend samples from video blocks of neighboring PUs across the video block of the PU in a direction and/or gradient associated with the intra prediction mode. The neighboring PUs may be above, above and to the right, above and to the left, or to the left of the PU, assuming a left-to-right, top-to-bottom encoding order for PUs, CUs, and treeblocks. Intra prediction unit 126 may use various numbers of intra prediction modes, e.g., 33 directional intra prediction modes, depending on the size of the PU.

Prediction unit 100 may select the prediction data for a PU from among the prediction data generated by motion compensation unit 124 for the PU or the prediction data generated by intra prediction unit 126 for the PU. In some examples, prediction unit 100 selects the prediction data for the PU based on rate/distortion metrics of the sets of prediction data.

If prediction unit 100 selects prediction data generated by intra prediction unit 126, prediction unit 100 may signal the intra prediction mode that was used to generate the prediction data for the PUs, e.g., the selected intra prediction mode. Prediction unit 100 may signal the selected intra prediction mode in various ways. For example, it is probable the selected intra prediction mode is the same as the intra prediction mode of a neighboring PU. In other words, the intra prediction mode of the neighboring PU may be the most probable mode for the current PU. Thus, prediction unit 100 may generate a syntax element to indicate that the selected intra prediction mode is the same as the intra prediction mode of the neighboring PU.

As discussed above, the video encoder 20 may include inter-layer prediction unit 128. Inter-layer prediction unit 128 is configured to predict a current block (e.g., a current block in the EL) using one or more different layers that are available in SVC (e.g., a base or reference layer). Such prediction may be referred to as inter-layer prediction. Inter-layer prediction unit 128 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer. Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

After prediction unit 100 selects the prediction data for PUs of a CU, residual generation unit 102 may generate residual data for the CU by subtracting (e.g., indicated by the minus sign) the predicted video blocks of the PUs of the CU from the video block of the CU. The residual data of a CU may include 2D residual video blocks that correspond to different sample components of the samples in the video block of the CU. For example, the residual data may include a residual video block that corresponds to differences between luminance components of samples in the predicted video blocks of the PUs of the CU and luminance components of samples in the original video block of the CU. In addition, the residual data of the CU may include residual video blocks that correspond to the differences between chrominance components of samples in the predicted video blocks of the PUs of the CU and the chrominance components of the samples in the original video block of the CU.

Prediction unit 100 may perform quadtree partitioning to partition the residual video blocks of a CU into sub-blocks. Each undivided residual video block may be associated with a different TU of the CU. The sizes and positions of the residual video blocks associated with TUs of a CU may or may not be based on the sizes and positions of video blocks associated with the PUs of the CU. A quadtree structure known as a "residual quad tree" (RQT) may include nodes associated with each of the residual video blocks. The TUs of a CU may correspond to leaf nodes of the RQT.

Transform unit 104 may generate one or more transform coefficient blocks for each TU of a CU by applying one or more transforms to a residual video block associated with the TU. Each of the transform coefficient blocks may be a 2D matrix of transform coefficients. Transform unit 104 may apply various transforms to the residual video block associated with a TU. For example, transform unit 104 may apply a discrete cosine transform (DCT), a directional transform, or a conceptually similar transform to the residual video block associated with a TU.

After transform unit 104 generates a transform coefficient block associated with a TU, quantization unit 106 may quantize the transform coefficients in the transform coefficient block. Quantization unit 106 may quantize a transform coefficient block associated with a TU of a CU based on a QP value associated with the CU.

Video encoder 20 may associate a QP value with a CU in various ways. For example, video encoder 20 may perform a rate-distortion analysis on a treeblock associated with the CU. In the rate-distortion analysis, video encoder 20 may generate multiple coded representations of the treeblock by performing an encoding operation multiple times on the treeblock. Video encoder 20 may associate different QP values with the CU when video encoder 20 generates different encoded representations of the treeblock. Video encoder 20 may signal that a given QP value is associated with the CU when the given QP value is associated with the CU in a coded representation of the treeblock that has a lowest bitrate and distortion metric.

Inverse quantization unit 108 and inverse transform unit 110 may apply inverse quantization and inverse transforms to the transform coefficient block, respectively, to reconstruct a residual video block from the transform coefficient block. Reconstruction unit 112 may add the reconstructed residual video block to corresponding samples from one or more predicted video blocks generated by prediction unit 100 to produce a reconstructed video block associated with a TU. By reconstructing video blocks for each TU of a CU in this way, video encoder 20 may reconstruct the video block of the CU.

After reconstruction unit 112 reconstructs the video block of a CU, filter unit 113 may perform a deblocking operation to reduce blocking artifacts in the video block associated with the CU. After performing the one or more deblocking operations, filter unit 113 may store the reconstructed video block of the CU in decoded picture buffer 114. Motion estimation unit 122 and motion compensation unit 124 may use a reference picture that contains the reconstructed video block to perform inter prediction on PUs of subsequent pictures. In addition, intra prediction unit 126 may use reconstructed video blocks in decoded picture buffer 114 to perform intra prediction on other PUs in the same picture as the CU.

Entropy encoding unit 116 may receive data from other functional components of video encoder 20. For example, entropy encoding unit 116 may receive transform coefficient blocks from quantization unit 106 and may receive syntax elements from prediction unit 100. When entropy encoding unit 116 receives the data, entropy encoding unit 116 may perform one or more entropy encoding operations to generate entropy encoded data. For example, video encoder 20 may perform a context adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, or another type of entropy encoding operation on the data. Entropy encoding unit 116 may output a bitstream that includes the entropy encoded data.

As part of performing an entropy encoding operation on data, entropy encoding unit 116 may select a context model. If entropy encoding unit 116 is performing a CABAC operation, the context model may indicate estimates of probabilities of particular bins having particular values. In the context of CABAC, the term "bin" is used to refer to a bit of a binarized version of a syntax element.

Video Decoder

Figure 3:
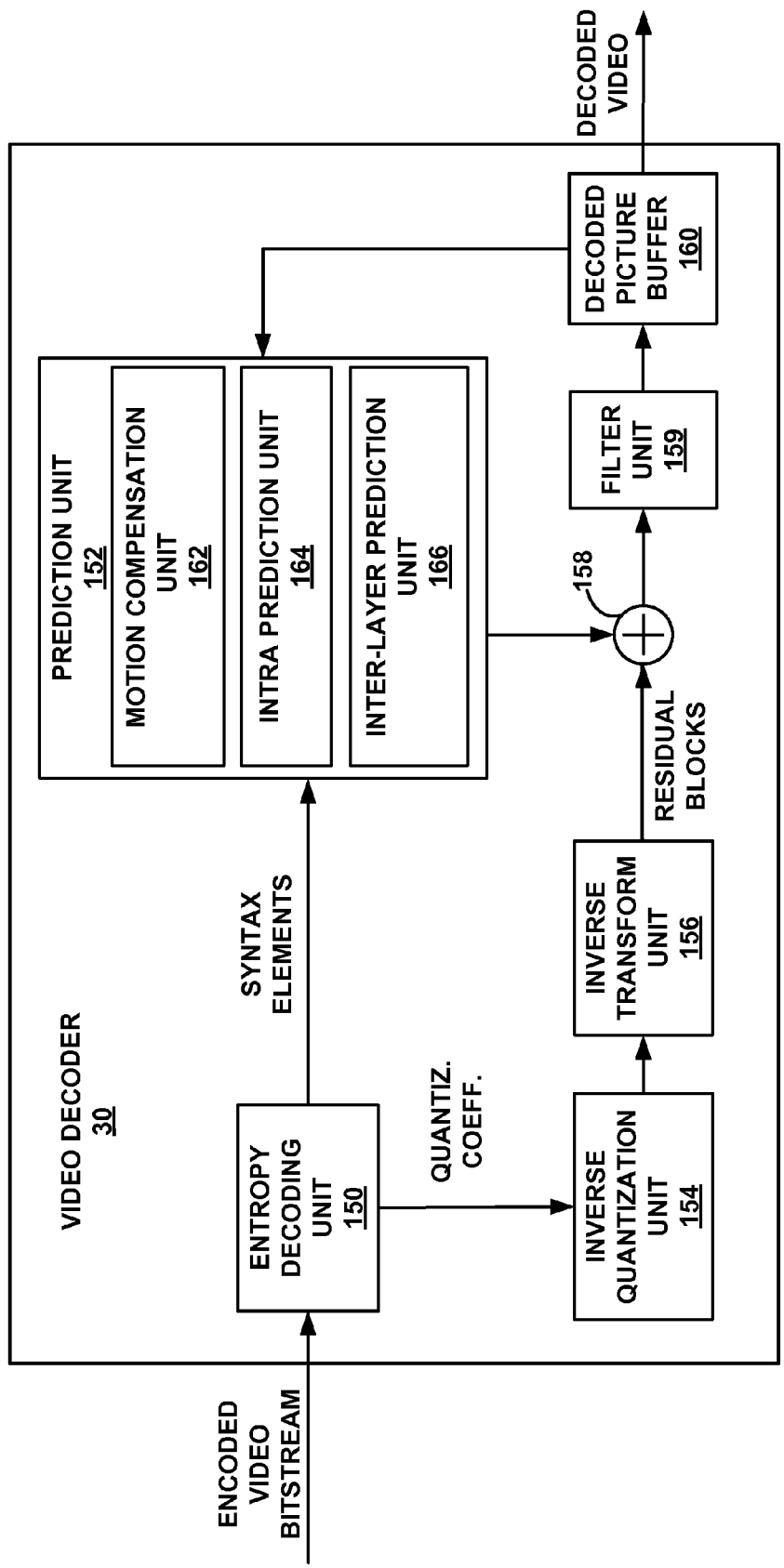
FIG. 3 is a block diagram illustrating an example of a video decoder that may implement techniques in accordance with aspects described in this disclosure.

FIG. 3 is a block diagram illustrating an example of a video decoder that may implement techniques in accordance with aspects described in this disclosure. Video decoder 30 may be configured to perform any or all of the techniques of this disclosure. As one example, motion compensation unit 162 and/or intra prediction unit 164 may be configured to perform any or all of the techniques described in this disclosure. In one embodiment, video decoder 30 may optionally include inter-layer prediction unit 166 that is configured to perform any or all of the techniques described in this disclosure. In other embodiments, inter-layer prediction can be performed by prediction unit 152 (e.g., motion compensation unit 162 and/or intra prediction unit 164), in which case the inter-layer prediction unit 166 may be omitted. However, aspects of this disclosure are not so limited. In some examples, the techniques described in this disclosure may be shared among the various components of video decoder 30. In some examples, in addition to or instead of, a processor (not shown) may be configured to perform any or all of the techniques described in this disclosure.

In the example of FIG. 3, video decoder 30 includes a plurality of functional components. The functional components of video decoder 30 include an entropy decoding unit 150, a prediction unit 152, an inverse quantization unit 154, an inverse transform unit 156, a reconstruction unit 158, a filter unit 159, and a decoded picture buffer 160. Prediction unit 152 includes a motion compensation unit 162, an intra prediction unit 164, and an inter-layer prediction unit 166. In some examples, video decoder 30 may perform a decoding pass generally reciprocal to the encoding pass described with respect to video encoder 20 of FIG. 2. In other examples, video decoder 30 may include more, fewer, or different functional components.

Video decoder 30 may receive a bitstream that comprises encoded video data. The bitstream may include a plurality of syntax elements. When video decoder 30 receives the bitstream, entropy decoding unit 150 may perform a parsing operation on the bitstream. As a result of performing the parsing operation on the bitstream, entropy decoding unit 150 may extract syntax elements from the bitstream. As part of performing the parsing operation, entropy decoding unit 150 may entropy decode entropy encoded syntax elements in the bitstream. Prediction unit 152, inverse quantization unit 154, inverse transform unit 156, reconstruction unit 158, and filter unit 159 may perform a reconstruction operation that generates decoded video data based on the syntax elements extracted from the bitstream.

As discussed above, the bitstream may comprise a series of NAL units. The NAL units of the bitstream may include video parameter set NAL units, sequence parameter set NAL units, picture parameter set NAL units, SEI NAL units, and so on. As part of performing the parsing operation on the bitstream, entropy decoding unit 150 may perform parsing operations that extract and entropy decode sequence parameter sets from sequence parameter set NAL units, picture parameter sets from picture parameter set NAL units, SEI data from SEI NAL units, and so on.

In addition, the NAL units of the bitstream may include coded slice NAL units. As part of performing the parsing operation on the bitstream, entropy decoding unit 150 may perform parsing operations that extract and entropy decode coded slices from the coded slice NAL units. Each of the coded slices may include a slice header and slice data. The slice header may contain syntax elements pertaining to a slice. The syntax elements in the slice header may include a syntax element that identifies a picture parameter set associated with a picture that contains the slice. Entropy decoding unit 150 may perform entropy decoding operations, such as CABAC decoding operations, on syntax elements in the coded slice header to recover the slice header.

As part of extracting the slice data from coded slice NAL units, entropy decoding unit 150 may perform parsing operations that extract syntax elements from coded CUs in the slice data. The extracted syntax elements may include syntax elements associated with transform coefficient blocks. Entropy decoding unit 150 may then perform CABAC decoding operations on some of the syntax elements.

After entropy decoding unit 150 performs a parsing operation on a non-partitioned CU, video decoder 30 may perform a reconstruction operation on the non-partitioned CU. To perform the reconstruction operation on a non-partitioned CU, video decoder 30 may perform a reconstruction operation on each TU of the CU. By performing the reconstruction operation for each TU of the CU, video decoder 30 may reconstruct a residual video block associated with the CU.

As part of performing a reconstruction operation on a TU, inverse quantization unit 154 may inverse quantize, e.g., de-quantize, a transform coefficient block associated with the TU. Inverse quantization unit 154 may inverse quantize the transform coefficient block in a manner similar to the inverse quantization processes proposed for HEVC or defined by the H.264 decoding standard. Inverse quantization unit 154 may use a quantization parameter QP calculated by video encoder 20 for a CU of the transform coefficient block to determine a degree of quantization and, likewise, a degree of inverse quantization for inverse quantization unit 154 to apply.

After inverse quantization unit 154 inverse quantizes a transform coefficient block, inverse transform unit 156 may generate a residual video block for the TU associated with the transform coefficient block. Inverse transform unit 156 may apply an inverse transform to the transform coefficient block in order to generate the residual video block for the TU. For example, inverse transform unit 156 may apply an inverse DCT, an inverse integer transform, an inverse Karhunen-Loeve transform (KLT), an inverse rotational transform, an inverse directional transform, or another inverse transform to the transform coefficient block. In some examples, inverse transform unit 156 may determine an inverse transform to apply to the transform coefficient block based on signaling from video encoder 20. In such examples, inverse transform unit 156 may determine the inverse transform based on a signaled transform at the root node of a quadtree for a treeblock associated with the transform coefficient block. In other examples, inverse transform unit 156 may infer the inverse transform from one or more coding characteristics, such as block size, coding mode, or the like. In some examples, inverse transform unit 156 may apply a cascaded inverse transform.

In some examples, motion compensation unit 162 may refine the predicted video block of a PU by performing interpolation based on interpolation filters. Identifiers for interpolation filters to be used for motion compensation with sub-sample precision may be included in the syntax elements. Motion compensation unit 162 may use the same interpolation filters used by video encoder 20 during generation of the predicted video block of the PU to calculate interpolated values for sub-integer samples of a reference block. Motion compensation unit 162 may determine the interpolation filters used by video encoder 20 according to received syntax information and use the interpolation filters to produce the predicted video block.

As further discussed below with reference to FIGS. 5 and 6, the prediction unit 152 may code (e.g., encode or decode) the PU (or any other enhancement layer blocks or video units) by performing the methods illustrated in FIGS. 5 and 6. For example, motion compensation unit 162, intra prediction unit 164, or inter-layer prediction unit 166 may be configured to perform the methods illustrated in FIGS. 5 and 6, either together or separately.

If a PU is encoded using intra prediction, intra prediction unit 164 may perform intra prediction to generate a predicted video block for the PU. For example, intra prediction unit 164 may determine an intra prediction mode for the PU based on syntax elements in the bitstream. The bitstream may include syntax elements that intra prediction unit 164 may use to determine the intra prediction mode of the PU.

In some instances, the syntax elements may indicate that intra prediction unit 164 is to use the intra prediction mode of another PU to determine the intra prediction mode of the current PU. For example, it may be probable that the intra prediction mode of the current PU is the same as the intra prediction mode of a neighboring PU. In other words, the intra prediction mode of the neighboring PU may be the most probable mode for the current PU. Hence, in this example, the bitstream may include a small syntax element that indicates that the intra prediction mode of the PU is the same as the intra prediction mode of the neighboring PU. Intra prediction unit 164 may then use the intra prediction mode to generate prediction data (e.g., predicted samples) for the PU based on the video blocks of spatially neighboring PUs.

As discussed above, video decoder 30 may also include inter-layer prediction unit 166. Inter-layer prediction unit 166 is configured to predict a current block (e.g., a current block in the EL) using one or more different layers that are available in SVC (e.g., a base or reference layer). Such prediction may be referred to as inter-layer prediction. Inter-layer prediction unit 166 utilizes prediction methods to reduce inter-layer redundancy, thereby improving coding efficiency and reducing computational resource requirements. Some examples of inter-layer prediction include inter-layer intra prediction, inter-layer motion prediction, and inter-layer residual prediction. Inter-layer intra prediction uses the reconstruction of co-located blocks in the base layer to predict the current block in the enhancement layer.

Inter-layer motion prediction uses motion information of the base layer to predict motion in the enhancement layer. Inter-layer residual prediction uses the residue of the base layer to predict the residue of the enhancement layer. Each of the inter-layer prediction schemes is discussed below in greater detail.

Reconstruction unit 158 may use the residual video blocks associated with TUs of a CU and the predicted video blocks of the PUs of the CU, e.g., either intra-prediction data or inter-prediction data, as applicable, to reconstruct the video block of the CU. Thus, video decoder 30 may generate a predicted video block and a residual video block based on syntax elements in the bitstream and may generate a video block based on the predicted video block and the residual video block.

After reconstruction unit 158 reconstructs the video block of the CU, filter unit 159 may perform a deblocking operation to reduce blocking artifacts associated with the CU. After filter unit 159 performs a deblocking operation to reduce blocking artifacts associated with the CU, video decoder 30 may store the video block of the CU in decoded picture buffer 160. Decoded picture buffer 160 may provide reference pictures for subsequent motion compensation, intra prediction, and presentation on a display device, such as display device 32 of FIG. 1. For instance, video decoder 30 may perform, based on the video blocks in decoded picture buffer 160, intra prediction or inter prediction operations on PUs of other CUs.

Coded Frame and Actual Frame of Base Layer (or Reference Layer)

Figure 4:
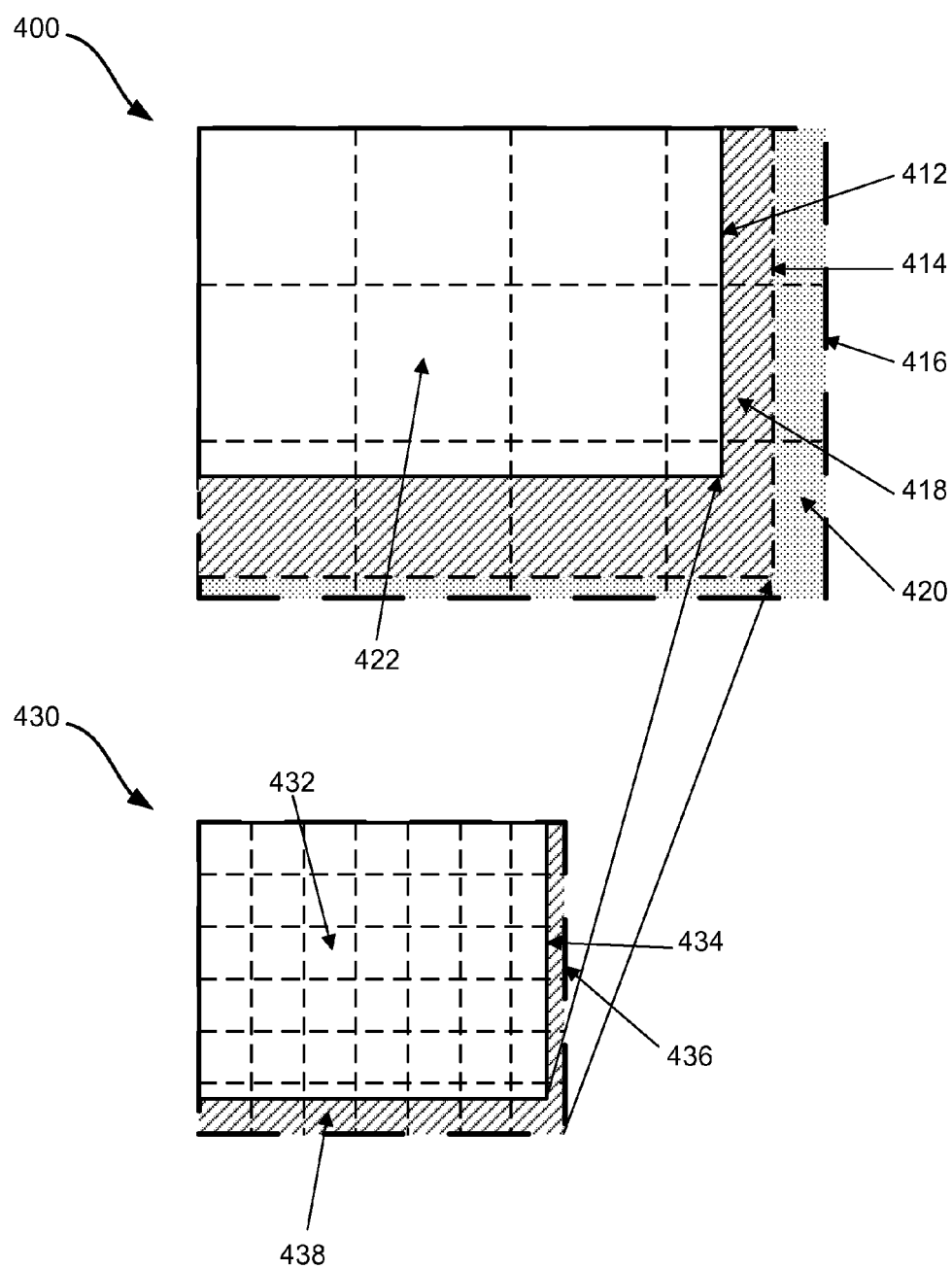
FIG. 4 is a diagram illustrating the various frames in the base layer and the enhancement layer.

FIG. 4 illustrates examples of various frame sizes of an enhancement layer 400 and a reference layer 430. The reference layer 430 may include an actual frame size 434 and a coded frame size 436. The actual frame size 434 may be defined by a conformance cropping window specified in a parameter set or defined by the display size of a display device. Thus, the actual frame size 434 may represent the size of the pictures in the reference layer 430 that are cropped to fit the actual frame size 434. The coded frame size 436 may be determined by the size of the smallest coding unit (SCU) 432 of the reference layer 430. As shown in FIG. 4, the coded frame size 436 may be an integer multiple of the SCU 432.

As discussed above, information in the reference layer 430 may be used to predict one or more enhancement layers. One example of such an enhancement layer is the enhancement layer 400 illustrated in FIG. 4. The frame sizes associated with the enhancement layer 400 may include an actual frame size 412 and a coded frame size 416. In addition, another frame size is illustrated between the actual frame size 412 and the coded frame size 416, which represents an upsampled version of coded frame size 436 of the reference layer 430. As shown in FIG. 4, the coded frame size 436 may be an integer multiple of the size of the SCU 422 of the enhancement layer 400.

Area 418 between the actual frame size 412 and the upsampled reference layer frame size 414 may include video blocks (e.g., coding units) that correspond to area 438 of the reference layer 430 that is located outside of the actual frame size 434 of the reference layer 430. As discussed below in greater detail, the information associated with the area 438 may or may not be available for predicting the enhancement layer 400 (e.g., the video blocks in the area 418). If the information in the area 438 is available for predicting the enhancement layer 400, the video blocks in the area 418 may be predicted using such information. As shown in FIG. 4, area 420 between the upsampled reference layer frame size 414 and the coded frame size 416 may not have any corresponding area in the reference layer 430.

In some embodiments, the actual frame size 434 (e.g., cropped picture, which is sometimes used in the present disclosure to refer to the actual frame or the actual frame size) and the coded frame size 436 (e.g., decoded picture, which is sometimes used in the present disclosure to refer to the coded frame or the coded frame size) may be the same.

In one embodiment, the actual frame size 434 (e.g., the size of the cropped picture) may be determined by the video data inputted to the coder (e.g., encoder or decoder), or set by the coder or the display device. For example, if the reference layer picture to be output by the coder is 33 pixels by 33 pixels, the actual frame size 434 would be 33 pixels by 33 pixels. Further, if the smallest coding unit were 8 pixels by 8 pixels for the reference layer 430, 5 SCUs would be used to cover the actual frame size both in the vertical direction and the horizontal direction (5*8=40, since 4*8=32 would fall short by 1 pixel). Thus, the coded frame size 416 in this example would be 40 pixels by 40 pixels. Thus, in both the vertical direction and the horizontal direction, there is a 7-pixel edge (e.g., shaded area 438) that is outside of the actual frame size 434.

Reference Layer Location Outside of Cropped Picture

In an embodiment of the HEVC extension, the enhancement layer texture or syntax (e.g., motion field or intra modes) can be predicted using the information of the corresponding block in the reference layer. For example, the "corresponding block" (or sub-block or pixel location) used herein may refer to a co-located block (e.g., a reference layer block that is co-located with respect to the enhancement layer block, both blocks corresponding to the same element of the picture in the respective layers), a neighboring block (e.g., a block that is adjacent to the co-located block), or any other block determined by the coder (e.g. encoder or decoder). In one embodiment, inter-layer texture prediction refers to the process of using reference layer texture information (e.g., pixel or sample values) to predict enhancement layer texture information, and inter-layer syntax prediction refers to the process of using reference layer syntax elements (e.g., motion vector, reference indices, prediction mode, etc.) to predict enhancement layer syntax elements. For example, syntax information may refer to non-texture or non-pixel information. Furthermore, a syntax element having more than a binary state (such that it can have a value other than just two values, such as 0 or 1) can be used for indication instead of a flag. The terms "flag" used herein refers generally to flags as well as such syntax elements. Further, in the present disclosure, a layer picture may also be referred to as a layer component. Similarly, a reference layer picture may also be referred to as a reference layer component.

As illustrated in FIG. 4, in certain situations, the area of the reference layer corresponding to a current block (e.g., a block in the enhancement layer that is currently being predicted) may be located outside of the reference layer frame. In one example, this may arise when the coded frame size is bigger than the actual frame size that might be displayed on a display device. In another example, such a situation may arise when the boundary padding size of the enhancement picture is larger than that of the reference layer picture. The different boundary padding size of the reference and enhancement layers could be introduced by the specific encoder setting. It may also be due to different smallest coding unit (SCU) sizes of the reference and enhancement layers. In some coding schemes (e.g., HEVC), the coded frame size may be aligned with the SCU size (a frame size is an integer multiple of SCUs), and thus, if the SCU of the enhancement layer is bigger than the SCU of the reference layer, there may be no syntax information for some parts of the enhancement layer frame. As shown in FIG. 4, the different sizes of the enhancement layer SCU 422 and the reference layer SCU 432 may result in a portion of the enhancement layer 400 not having a corresponding region in the reference layer 430 from which motion information or pixel information may be obtained for inter-layer prediction. In another example, the unavailability of reference layer information may occur when the reference layer is coded according to a video standard (e.g., AVC or MPEG2) other than the one used for the enhancement layer (e.g., HEVC).

In such situations (e.g., when the reference layer block or pixel location corresponding to the current block in the enhancement layer is located outside of the cropped picture), the coder (e.g., encoder or decoder) cannot access the portion of the reference layer that is outside of the cropped picture since that portion is not output by, for example, the decoder that has decoded the reference layer, and thus cannot be used to predict the current block in the enhancement layer. Thus, in some embodiments, the area outside of the cropped picture may be marked as unavailable to the coder (e.g., encoder or decoder) and not used in inter-layer prediction (or any prediction) of the enhancement layer. For example, the current block in the enhancement layer may be coded (e.g., encoded or decoded) based on information derived from an upsampled and/or padded version of the cropped picture (which is output by the decoder and thus available for predicting the enhancement layer) in the reference layer or information derived from another block inside the cropped picture.

However, in certain scenarios, even if the area of the reference layer corresponding to the current block in the enhancement layer is located outside of the cropped picture, the information of such reference layer block may be available for use in inter-layer prediction of the current block. For example, if both the reference layer and the enhancement layer are compatible with HEVC, the full decoded picture (e.g., 436 in FIG. 4) may be available to the coder (e.g., encoder or decoder) such that the coder can use the information of the reference layer block to predict the current block in the enhancement layer. For example, when decoding the current layer picture (e.g., enhancement layer picture), decoded samples as well as related syntaxes and variables (e.g., motion information) of all regions in the decoded reference layer picture, including those outside of the cropped picture (or the conformance cropping window) may be available or accessible to the decoding process. In another example, even when the reference layer does not follow the HEVC design or the coding scheme of the enhancement layer (e.g., the reference layer is AVC compatible, and the enhancement layer is HEVC compatible), the information outside of the cropped picture may still be available or accessible to the decoding process. In such scenarios, marking the area of the reference layer outside of the cropped picture unavailable just for being outside of the cropped picture may result in reduced coding efficiency. Thus, by selectively enabling the use of such area outside of the cropped picture (e.g., depending on whether the cropped picture or the full decoded picture is available for use by the coder), coding efficiency may be improved.

Thus, in the following sections, how the use of the information outside of the cropped picture may be enabled (e.g., indicated as being available for use) is described, according to example embodiments of the present disclosure.

Determining Availability of Information Outside of Cropped Picture Based on Reference Layer Codec In some existing coding schemes, a reference layer codec may be HEVC or H.264/AVC, or a general, non-HEVC codec. In addition, there may be a flag in a parameter set indicating the codec to be used. For example, a flag in the video parameter set (VPS) may indicate whether HEVC or AVC is used to code the reference layer. In one example, a flag avc_base_layer_flag may have a value equal to 1, indicating that the reference layer codec conforms to the video coding standard according to Recommendation ITU-T H.264 I International Standard ISO/IEC 14496-10, and alternatively, may have a value equal to 0, indicating that the reference layer codec conforms to the HEVC specification. Therefore, a coding device configured to encode or decode an enhancement layer may have information regarding whether AVC or HEVC is used with respect to the reference layer.

In one embodiment, the inter-layer prediction methods that may be used for predicting the enhancement layer may depend on whether the reference layer codec conforms to a particular coding scheme. The particular coding scheme may be any predetermined coding scheme that may indicate whether the reference layer information outside of the cropped picture may be available. In one example, the particular coding scheme is HEVC. In such example, the inter-layer prediction methods used for coding the enhancement layer may depend on whether the reference layer codec conforms to HEVC. For example, the coder may check, using the codec information discussed above, which reference layer codec is used, and if the reference layer codec conforms to HEVC, the coder (e.g., encoder or decoder) may predict the enhancement layer based on the information obtained from the reference layer, even for portions (e.g., blocks or cording units) of the enhancement layer that correspond to an area of the reference layer that is outside of the cropped picture. On the other hand, if the reference layer codec does not conform to HEVC, the coder (e.g., encoder or decoder) may use padding to predict those portions of the enhancement layer that corresponds to the area of the reference layer that is outside of the cropped picture.

In one embodiment, whether the reference layer codec conforms to a predefined coding scheme is signaled using a flag. In one embodiment, a flag using_cropped_reference_layer_flag may be signaled to indicate whether the cropped picture in the reference layer is to be used. For example, if the value of the flag is 1, the cropped picture may be used to predict the enhancement layer (e.g., information outside of the cropped picture may not be used). On the other hand, if the value of the flag is 0, the decoded picture may be used to predict the enhancement layer. In one embodiment, once the determination as to which picture (e.g., cropped picture or decoded picture) may be used to predict the enhancement layer, any upsampling and/or padding that may be appropriate for predicting the enhancement layer may be performed.

In one embodiment, the flag using_cropped_reference_layer_flag controls both inter-layer texture prediction and inter-layer syntax prediction. In one example, if the value of the flag is 1, the cropped picture is used for both inter-layer texture prediction and inter-layer syntax prediction. If the flag is 0, the decoded picture is used for both inter-layer texture prediction and inter-layer syntax prediction.

In another embodiment, separate flags are signaled for inter-layer texture prediction and inter-layer syntax prediction. For example, the flag using_cropped_reference_layer_texture_flag for inter-layer texture prediction and using_cropped_reference_layer_syntax_flag for inter-layer syntax prediction may be used to indicate whether inter-layer texture prediction and/or inter-layer syntax prediction may be performed based on the information outside of the cropped picture in the reference layer.

By using separate flags for inter-layer texture prediction and inter-layer syntax prediction, either inter-layer texture prediction or inter-layer syntax prediction may be selectively performed, and coding flexibility and/or coding efficiency may be improved.

In one embodiment, the values of the flags indicating whether the decoded picture of the reference layer can be used for inter-layer texture and/or syntax prediction may depend on the reference layer codec. For example, if the reference layer is coded according to the HEVC specification, the full decoded picture may be used for inter-layer texture and syntax prediction. In one embodiment, one or more flags may be set and signaled based on the reference layer codec. In another embodiment, the signaling of the flags may be skipped, and the appropriate values of the flags may be inferred (e.g., from the reference codec). For example, the flag avc_base_layer_flag discussed above may be used to determine whether the reference layer codec conforms to the video coding standard according to Recommendation ITU-T H.264 I International Standard ISO/IEC 14496-10 or to the HEVC specification.

In one embodiment, if the reference layer is coded with H.264/AVC, then only the cropped picture of the reference layer can be used for inter-layer texture and syntax predictions. In another embodiment, if the reference layer is coded with H.264/AVC, then only inter-layer texture prediction can be performed (e.g., using only the cropped picture) and no inter-layer syntax prediction can be performed. In one embodiment, the signaling of the flag for syntax prediction may be skipped, and the value of the syntax flag may be inferred from another flag (e.g., avc_base_layer_flag) or assumed to be disabled (e.g., equal to zero).

Figure 5:
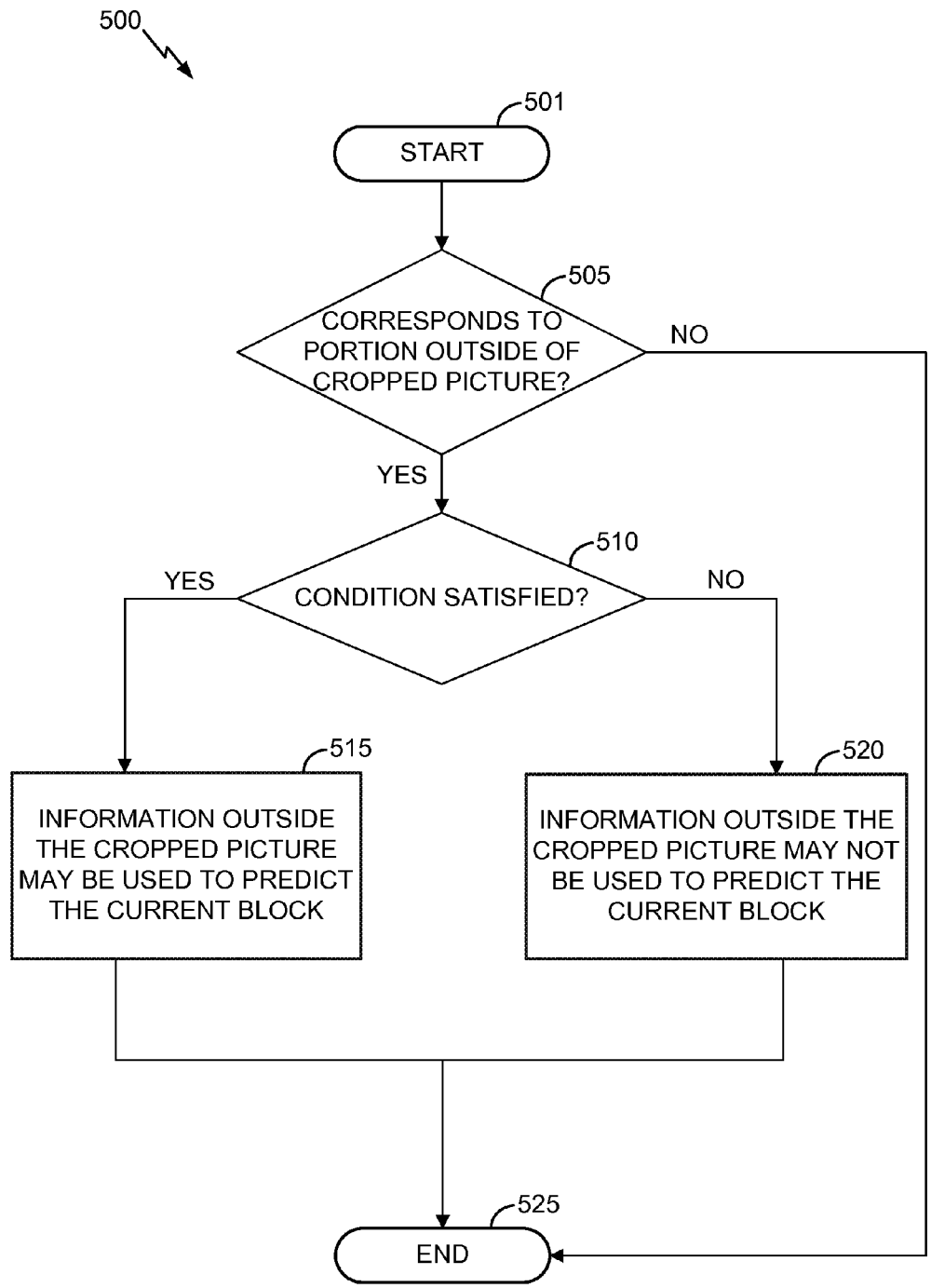
FIG. 5 is a flow chart illustrating a method of coding video information, according to an embodiment of the present disclosure.

FIG. 5 is a flowchart illustrating a method 500 for coding video information, according to an embodiment of the present disclosure. The steps illustrated in FIG. 5 may be performed by an encoder (e.g., the video encoder as shown in FIG. 2), a decoder (e.g., the video decoder as shown in FIG. 3), or any other component. For convenience, method 500 is described as performed by a coder, which may be the encoder, the decoder or another component.

The method 500 begins at block 501. In block 505, the coder determines whether the current block in the enhancement layer corresponds to a portion outside of the cropped picture (e.g., output region or actual frame) in the reference layer. The portion of the reference layer that corresponds to the current block may be completely outside of the cropped picture or partially outside of the cropped picture. If the coder determines that the current block does not correspond to a portion outside of the cropped picture, the method ends at block 525. On the other hand, if the coder determines that the current block corresponds to a portion outside of the cropped picture, the coder proceeds to block 510. In block 510, the coder determines whether a condition indicates that information outside of the cropped picture is available to predict the current block. In one embodiment, such condition is satisfied when the reference layer is coded by a codec conforming to a predefined coding standard (e.g., HEVC). In another embodiment, the condition may comprise a flag that indicates whether the information outside of the cropped picture is available to predict the current block. In the example of a decoder, the decoder may check for a special flag that has been encoded into the bitstream (e.g., in one example, the encoder may be configured to signal such flag to indicate whether the information outside of the cropped picture may be used for inter-layer prediction). Alternatively, the decoder may check an existing flag or parameter. Similarly, the encoder may process a special flag that indicates whether the condition is satisfied or check an existing flag or parameter in determining whether to use the information outside of the cropped picture. The encoder or decoder may also check more than one flags or parameters (e.g., layer ID, codec type, etc.). If the coder determines that the condition is satisfied, the information outside of the cropped picture may be used by the coder to predict the current block in the enhancement layer in block 515. In one embodiment, the coder uses the information outside of the cropped picture to predict the current picture. In another embodiment, the coder does not use the information outside of the cropped picture to predict the current picture. For example, the coder uses another reference picture defined by another reference index to predict the current block. In another example, the coder may use intra mode to predict the current block. For example, the coder may compare various different predictors for the current block and choose the one that results in the highest coding efficiency (or some other performance parameter). In one embodiment, the prediction involves inter-layer texture prediction. In another embodiment, the prediction involves inter-layer syntax prediction. In yet another embodiment, the prediction involves inter-layer texture and syntax prediction. On the other hand, if the coder determines that the condition is not satisfied, the information outside of the cropped picture of the reference layer may not be used by the coder to predict the current block in block 520. For example, the coder may use padding to estimate sample values outside of the cropped picture and predict the current block based on the padded values. In another example, no inter-layer prediction is used for the current block corresponding to a location outside of the cropped picture. In one more example, information inside the cropped picture of the reference layer may be used to predict the current block. The method 500 ends at block 525.

In the method 500, one or more of the blocks shown in FIG. 5 may be removed (e.g., not performed) and/or the order in which the method is performed may be switched. For example, the determination of whether the current block corresponds to a portion outside of the cropped picture may not be performed as part of the method 500.

As discussed above, one or more components of video encoder 20 of FIG. 2 or video decoder 30 of FIG. 3 (e.g., inter-layer prediction unit 128 of FIG. 2 and/or inter-layer prediction unit 166 of FIG. 3) may be used to implement any of the techniques discussed in the present disclosure, such as determining whether the condition for predicting a current block in the enhancement layer based on information of a reference layer block that is located outside of the cropped picture is satisfied, and predicting the current block using (or without using) the information outside of the cropped picture of the reference layer.

By using a flag to signal whether the portion of the reference layer that is outside of the cropped picture may be used for coding the enhancement layer, the coder need not blindly refrain from using information outside of the cropped picture and can use such information to improve the coding efficiency. For example, the information outside of the cropped picture may be used if the flag indicates that the reference layer codec conforms to the HEVC specification. Other conditions may be used to determine whether the information outside of the cropped picture may be available (e.g., scalability ratio or layer ID as discussed below, or any other condition not specifically discussed herein but may indicate whether the information outside of the cropped picture may be available for use by the coder).

In one embodiment, the flag indicates whether the information outside of the cropped picture can be used, and does not indicate whether the information outside of the cropped picture is used or must be used. Thus, the signaling scheme provides flexibility to the coder (e.g., encoder or decoder), and even when the flag indicates that the information outside of the cropped picture can be used, the coder (e.g., encoder or decoder) may or may not use such information to predict the enhancement layer.

In one example, an AVC-compatible chip may be used. Such AVC chip may output only the cropped picture and not the entire decoded picture. Thus, a flag value may be set to 1, indicating that only the cropped picture is available. In another example, an HEVC-compatible chip may be used. The output of the HEVC chip may include more than the cropped picture. In such case, the flag value may be set to 0, indicating that information outside of the cropped picture is available for inter-layer prediction. Alternatively, the flag value may be set to 0 (e.g., if the HEVC chip is designed for a single layer and re-designing of the chip is not desired), such that the information outside of the cropped picture is not used to code (e.g., encode or decode) the enhancement layer. Thus, by using the flag to indicate whether the information outside of the cropped picture can be used, coding flexibility and/or coding efficiency is increased.

Determining Availability of Information Outside of Cropped Picture Based on Scalability Ratio of Reference and Enhancement Layers In the case of spatial scalability, the reference layer and the enhancement layer may have different resolutions, and before using the reference layer pictures to predict the enhancement layer, the reference layer pictures may need to be upsampled. Thus, this resolution ratio (or scalability ratio) may indicate whether upsampling is needed in order to perform inter-layer prediction.

In one embodiment, the inter-layer prediction methods that may be used for coding the enhancement layer may depend on the scalability ratio (e.g., resolution ratio) between the reference layer and the enhancement layer. In one example, the decoded reference layer picture may be used for inter-layer texture and syntax prediction in the case of SNR scalability (e.g., wherein the scalability ratio is one), and only the cropped picture (or the conformance cropping window) may be used for spatial scalability (e.g., the reference layer and the enhancement layer have different resolutions).

In one embodiment, a flag indicating whether the scalability ratio is 1 may be signaled, and the inter-layer prediction methods may be determined based on the value of the flag. In another embodiment, a flag indicating whether the scalability ratio is greater than 1 may be signaled, and the inter-layer prediction methods may be determined based on the value of the flag.

Determining Availability of Information Outside of Cropped Picture Based on Layer ID of the Reference Layer In one embodiment, the inter-layer prediction methods that may be used for coding the enhancement layer may depend on whether the reference layer is a base layer without any reference layer of its own. For example, such layer may be a true base layer coded with the most basic level of quality. In one embodiment, a flag indicating whether the reference layer is a true base layer may be signaled, and the inter-layer prediction methods available for coding the enhancement layer may be determined based on the value of the flag.

In one embodiment, the inter-layer prediction methods that may be used for coding the enhancement layer may depend on the layer ID (e.g., nuh_layer_id) of the reference layer. In one example, if the layer ID of the reference layer is 0, the reference layer is a base layer that has no reference layer of its own. In such example, a flag indicating whether the layer ID of the reference layer is 0 may be signaled, and the inter-layer prediction methods available for coding the enhancement layer may be determined based on the value of the flag. For example, if the layer ID of the reference layer is 0, the cropped picture (or the conformance cropping window) may be used to predict the enhancement layer, and if the layer ID of the reference layer is not 0, the decoded reference layer picture may be used for inter-layer texture and syntax prediction.

Single-flag and Two-flag Implementation Examples

In one embodiment, using_cropped_reference_layer_flag equal to 1 specifies that inter-layer texture and syntax predictions can be used for those portions of the enhancement layer that correspond to locations inside the conformance cropping window, and that inter-layer texture and syntax predictions are disabled for those portions of the enhancement layer that correspond to locations outside of the conformance cropping window. In one embodiment, if the flag is equal to 1, one of the inter-layer texture and syntax predictions may still be used for those portions of the enhancement layer that correspond to locations outside of the conformance cropping window. For example, even if the flag is equal to 1, the inter-layer texture prediction, but not the inter-layer syntax prediction, may be used. In another example, even if the flag is equal to 1, the inter-layer syntax prediction, but not the inter-layer texture prediction, may be used. On the other hand, using_cropped_reference_layer_flag equal to 0 specifies that both inter-layer texture and syntax predictions based on the information outside of the conformance cropping window can be used to predict the enhancement layer. In one embodiment, if the flag is not present in the bitstream, it is set to a default value. In one embodiment, the default value is 0. In another embodiment, the default value is 1.

In one embodiment, using_cropped_reference_layer_texture_flag equal to 1 specifies that inter-layer texture prediction can be used for those portions of the enhancement layer that correspond to locations inside the conformance cropping window, and that inter-layer texture prediction is disabled for those portions of the enhancement layer that correspond to locations outside of the conformance cropping window. On the other hand, using_cropped_reference_layer_texture_flag equal to 0 specifies that inter-layer texture prediction can be used to predict the enhancement layer. In one embodiment, if the flag is not present in the bitstream, it is set to a default value. In one embodiment, the default value is 0. In another embodiment, the default value is 1.

In one embodiment, using_cropped_reference_layer_syntax_flag equal to 1 specifies that inter-layer syntax prediction can be used for those portions of the enhancement layer that correspond to locations inside the conformance cropping window, and that inter-layer syntax prediction is disabled for those portions of the enhancement layer that correspond to locations outside of the conformance cropping window. On the other hand, using_cropped_reference_layer_syntax_flag equal to 0 specifies that inter-layer syntax prediction can be used to predict the enhancement layer. In one embodiment, if the flag is not present in the bitstream, it is set to a default value. In one embodiment, the default value is 0. In another embodiment, the default value is 1.

Methods Used for Inter-Layer Prediction

In some embodiments, one or more flags (e.g., the flags discussed above) may be used to control how one or more inter-layer prediction methods may be performed. For example, one or more flags may indicate that for inter-layer texture prediction, cropping and padding can be used for the reference layer and the upsampled reference layer, but for inter-layer syntax prediction, the syntax may not be padded but simply default values can be used. In one embodiment, the padding may include copying pixels from the cropped picture (e.g., by extending the border pixels of the cropped picture) along the horizontal and vertical directions, thereby populating the unavailable region outside of the cropped picture. In another example, for predicting motion information, a default motion vector (e.g., a zero motion vector) and reference index may be used. In some embodiments, the motion information may not exhibit a strong spatial correlation, especially if the motion information represents blocks of pixels having a bigger size such as 16×16, 32×32, etc. In such cases, the coding performance may be improved by using a default value for syntax prediction.

In some embodiments, if a particular flag (e.g., using_cropped_reference_layer_texture_flag) is enabled (e.g., value of 1), the coder (e.g., encoder or decoder) may perform the inter-layer texture prediction based on the cropped picture by upsampling and/or padding the cropped picture and using the upsampled/padded picture to predict the texture of the enhancement layer. For example, the upsampling may be performed if the resolution ratio between the sizes of the reference layer and the enhancement layer has a value other than 1. The upsampling may be performed according to the resolution ratio.

In one embodiment, the cropped picture (or the decoded picture if the decoded picture needs to be padded) may be padded using neighboring pixels. In one example, the pixel padding method may be the same as the pixel padding method used for interpolation (e.g., motion compensation interpolation).

In one embodiment, the portions of the reference layer outside of the cropped picture may be assigned a default value. Such default value may be 0 (e.g., smallest value). In another example, a default value of 1<<(bit-depth−1) is used (e.g., median value). For example, if the bit-depth of the enhancement layer (or reference layer if the default value is assigned before any necessary upsampling or bit-shifting) is 10, the default value may be 1<<(10−1), which is 512. In yet another example, a default value of (1<<bit-depth)−1 is used (e.g., maximum value). For example, if the bit-depth of the enhancement layer is 10, the default value may be (1<<10)−1, which is 1023. In another embodiment, the default value may be set to any other value that is signaled or predefined.

Similarly, default values may be assigned to the portions of the reference layer outside of the cropped picture for inter-layer syntax prediction. Alternatively, syntax values of those portions outside of the cropped picture may be derived from the syntax values of the portions inside the cropped picture, and the derived syntax values may be used for predicting the syntax values of the enhancement layer.

Figure 6:
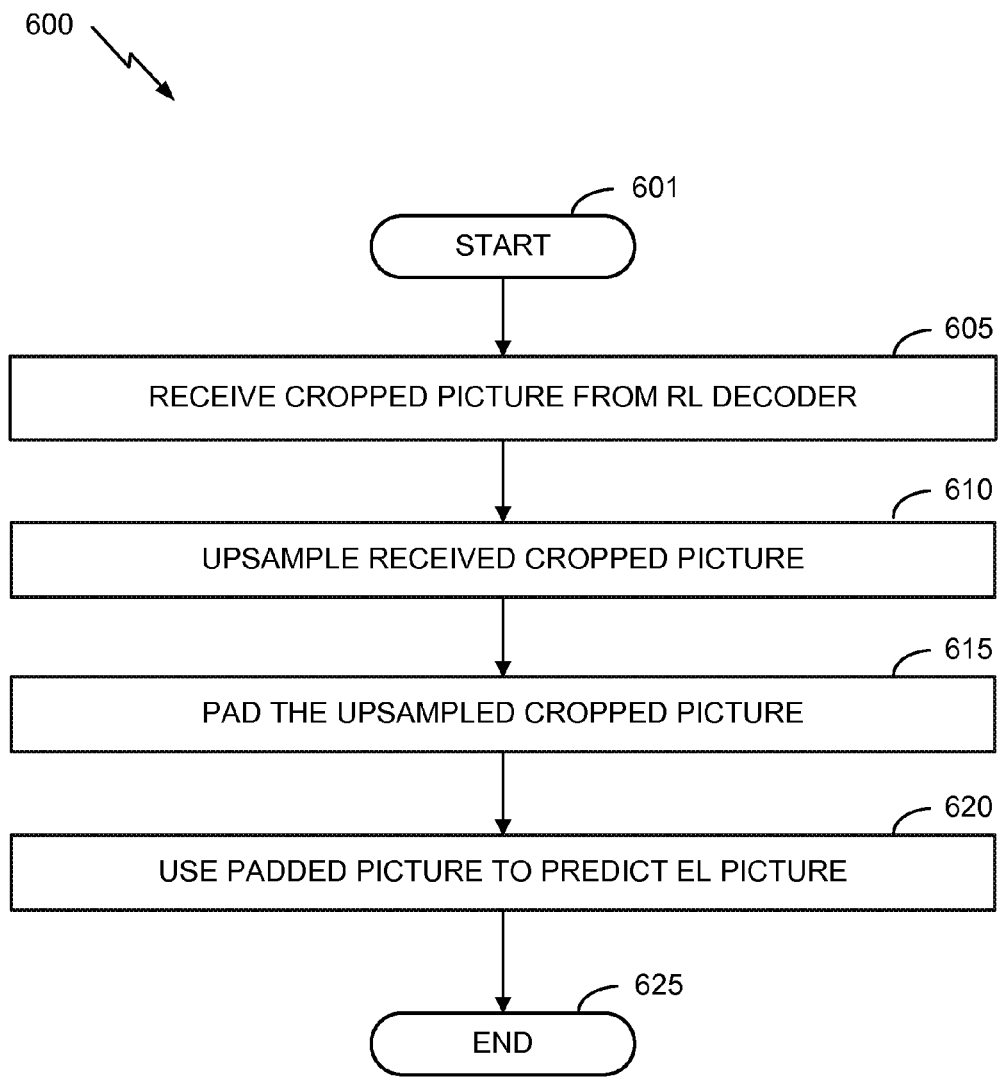
FIG. 6 is a flow chart illustrating a method of coding video information, according to an embodiment of the present disclosure.

FIG. 6 is a flowchart illustrating a method 600 for coding video information, according to an embodiment of the present disclosure. The steps illustrated in FIG. 6 may be performed by an encoder (e.g., the video encoder as shown in FIG. 2), a decoder (e.g., the video decoder as shown in FIG. 3), or any other component. For convenience, method 600 is described as performed by a coder, which may be the encoder, the decoder or another component. For example, the method 600 may illustrate an example for predicting the current block without using the information outside of the cropped picture (e.g., shaded area 438 in FIG. 4). However, the prediction techniques of the present disclosure are not limited by the example, and may include other coding methods or techniques discussed herein or known.

The method 600 begins at block 601. In block 605, the coder receives the cropped picture from the reference layer decoder. In block 610, the coder upsamples the received cropped picture (e.g., according to the resolution ratio between the sizes of the reference layer and the enhancement layer). In block 615, the coder pads the upsampled cropped picture, for example, to predict sample values that are outside of the upsampled cropped picture of the reference layer. In block 620, the coder uses the padded picture to predict the enhancement layer picture. The method 600 ends at block 640.

As discussed above, one or more components of video encoder 20 of FIG. 2 or video decoder 30 of FIG. 3 (e.g., inter-layer prediction unit 128 of FIG. 2 and/or inter-layer prediction unit 166 of FIG. 3) may be used to implement any of the techniques discussed in the present disclosure, such as receiving the cropped picture output by the reference layer decoder, upsampling the cropped picture, padding the upsampled picture, and predicting the current block in the EL using the padded picture.

In the method 600, one or more of the blocks shown in FIG. 6 may be removed (e.g., not performed) and/or the order in which the method is performed may be switched. Although the method 600 is described in terms of using the cropped picture, similar techniques may be used for using the decoded picture if upsampling and/or padding of the decoded picture is appropriate for predicting the enhancement layer.

One or more high level flags or syntax elements that control inter-layer texture and syntax predictions may be signaled in at least one parameter set, for example, such as video parameter set (VPS), sequence parameter set (SPS), picture parameter set (PPS), adaptation parameter set (APS), slice header, at the block level, or in combination. If such flags are used at multiple levels, a lower-level signaling may override a higher-level signaling, and a higher-level signaling may control or indicate whether the signaling is present at the next lower level. Alternatively, one or more default values may be signaled in the bitstream, such as in the VPS, SPS, PPS, APS, slice header, or at the block level.

Dependency Between Flags

As discussed above, in some embodiments, two flags may be used to indicate whether to use the decoded picture of the reference layer: one for texture, and one for syntax. In one embodiment, the values of the flags may depend on each other. For example, if the texture flag indicates that only the cropped picture of the reference layer may be used for inter-layer texture prediction, then the syntax flag may also indicate that only the cropped picture may be used for inter-layer syntax prediction. In one example, this dependency is implemented by introducing a constraint on the value of the syntax flag (e.g., causing it to track the value of the texture flag). In another example, the signaling of the syntax flag may be skipped and the value of the syntax flag may be inferred from the value of the texture flag. Similar techniques may be used in the case where the value of the texture flag depends on the value of the syntax flag.

Signaling Example #1

In one example, a flag (e.g., vps_ilp_within_conformance_cropping_window_flag) may be signaled in the video parameter set (VPS) to indicate whether inter-layer prediction can be performed based on the portions of the reference layer that are outside of the cropped picture. The flag value equal to 1 may specify that, within the coded video sequence, inter-layer prediction is not allowed to be performed for any syntax elements, variables, or sample values used in the decoding process, from outside of the conformance cropping window of the reference layer component with nuh_layer_id equal to 0. For example, if the reference layer is a base layer without any reference layers of its own, inter-layer texture and syntax prediction may not be performed based on the portions outside of the cropped picture. On the other hand, the flag value equal to 0 may specify that such limitation on inter-layer prediction is not applicable.

In another embodiment, the flag for indicating whether inter-layer prediction can be performed based on the portions of the reference layer that are outside of the cropped picture is present in the VPS only if there is an indication in the VPS that the base layer (e.g., nuh_layer_id equal to 0) has been coded by a codec that does not conform to a particular coding scheme. In one embodiment, the flag is present only if it is indicated in the VPS that the base layer has been coded by a codec that does not conform to the profile specified in the HEVC specification.

Signaling Example #2

In one embodiment, a flag signaled in the VPS indicates whether inter-layer prediction can be performed based on the portions of the reference layer that are outside of the cropped picture. The flag value equal to 1 may specify that, within the coded video sequence, inter-layer prediction is not allowed to be performed for any syntax elements, variables, or sample values used in the decoding process, from outside of the conformance cropping window of the reference layer component with nuh_layer_id equal to 0, but inter-layer texture prediction can be performed with padded sample values outside of the conformance cropping window. For example, if the reference layer is a base layer without any reference layers of its own, inter-layer syntax prediction may not be performed based on the portions outside of the cropped picture, but inter-layer texture prediction may be performed based on padded sample values (e.g., after padding is applied to the cropped picture of the reference layer). On the other hand, the flag value equal to 0 may specify that such limitation on inter-layer prediction is not applicable.

In another embodiment, the flag for indicating whether inter-layer prediction can be performed based on the portions of the reference layer that are outside of the cropped picture is present in the VPS only if there is an indication in the VPS that the base layer (e.g., nuh_layer_id equal to 0) does not conform to a particular coding scheme. In one embodiment, the flag is present only if it is indicated in the VPS that the base layer does not conform to the profile specified in the HEVC specification.

Signaling Example #3

In one example, a single flag may be used to control all the reference layers. For example, the single flag may indicate whether inter-layer prediction may be performed based on the portions outside of the cropped picture in each of the reference layers. In another example, a flag (e.g., vps_ilp_within_conformance_cropping_window_flag) is signaled in the VPS for each layer that is used as reference layer for coding (e.g., encoding or decoding) another layer. One implementation of such signaling is illustrated in the following syntax table. For example, such syntax may be added to VPS syntax table.

TABLE 1

Example Syntax Added to VPS Syntax Table

```
for( i =0; i < vps_max_layers_minus1; i++ ) {
    vps_ilp_within_conformance_cropping_window_flag [ i ]   u(1)
}
```

In another embodiment, the flag for indicating whether inter-layer prediction can be performed based on the portions of the reference layer that are outside of the cropped picture is present in the VPS only if there is an indication in the VPS that the base layer (e.g., nuh_layer_id equal to 0) does not conform to a particular coding scheme. In one embodiment, the flag is present only if it is indicated in the VPS that the base layer does not conform to the profile specified in the HEVC specification. In one embodiment, each flag value for all enhancement layers (e.g., layers with nuh_layer_id greater than 0) and any reference layers that conform to a particular coding scheme is set to a default value. In one embodiment, if nuh_layer_id is greater than 0, the layer is not AVC, and thus the decoded picture is more likely to be available. In one example, any reference layers that conform to the profile specified in the HEVC specification, along with any enhancement layers, may have the corresponding flag value set to 0 by default.

In another embodiment, the flag for indicating whether inter-layer prediction can be performed based on the portions of the reference layer that are outside of the cropped picture is present in the VPS only for the base layer (e.g., nuh_layer_id equal to 0). For any enhancement layer having nuh_layer_id greater than 0, the flag value is set to 0 by default.

It is to be recognized that the embodiments and examples disclosed herein are applicable for MVC and 3DV HEVC extensions for controlling inter-view prediction. Similar techniques may be used for controlling inter-view prediction, with necessary modifications that are known to the persons of ordinary skill in the art. In such cases, inter-layer prediction may be read as inter-view prediction in the above description, and a reference layer may be read as a reference view.

Information and signals disclosed herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may be implemented in hardware, software, firmware, or any combination thereof.

Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC). Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

Various embodiments of the invention have been described. These and other embodiments are within the scope of the following claims.

What is claimed is:

1. An apparatus configured to code video information, the apparatus comprising:
   a memory configured to store video information associated with a reference layer (RL) and an enhancement layer (EL), the RL comprising an RL picture having an output region corresponding to a conformance cropping window of the RL, and the EL comprising an EL picture corresponding to the RL picture; and
   a processor in communication with the memory, the processor configured to:
      determine that a current block in the EL picture at least partially corresponds to a region in the RL picture that is outside of the output region;
      determine, based on a condition, whether information associated with the region in the RL that is outside of the output region is available to the apparatus for use in predicting the current block in the EL picture, wherein the condition comprises one or more of (i) whether the RL picture and the EL picture have the same width and height, (ii) whether the RL conforms to High-Efficiency Video Coding (HEVC), and (iii) whether a layer identifier (ID) value associated with the RL is equal to zero; and
      perform one of (i) encode or decode the current block using the information associated with the region in the RL picture that is outside of the output region based on the condition being satisfied, or (ii) encode or decode the current block without using the information associated with the region in the RL picture that is outside of the output region based on the condition not being satisfied.

2. The apparatus of claim 1, wherein the output region is smaller than the RL picture.

3. The apparatus of claim 1, wherein the apparatus comprises an encoder, and wherein the processor is further configured to encode the current block of the EL using the information associated with the region in the RL picture that is outside of the output region.

4. The apparatus of claim 1, wherein the apparatus comprises a decoder, and wherein the processor is further configured to decode the current block of the EL using the information associated with the region in the RL picture that is outside of the output region.

5. The apparatus of claim 1, wherein the apparatus comprises a device selected from a group consisting of: a computer, a notebook computer, a laptop computer, a tablet computer, a set-top box, a telephone handset, a smart phone, a smart pad, a television, a camera, a display device, a digital media player, a video gaming console, and an in-car computer.

6. The apparatus of claim 1, wherein the processor is further configured to determine whether the RL conforms to HEVC based upon a codec used to code the RL.

7. The apparatus of claim 6, wherein the processor is further configured to determine whether the RL conforms to HEVC by processing a flag that indicates whether the codec used to code the RL is an Advanced Video Coding (AVC) codec.

8. The apparatus of claim 1, wherein the processor is further configured to determine whether the condition is satisfied at least in part by processing a first flag and a second flag, the first flag indicating whether texture information of the current block may be predicted using the information associated with the region in the RL picture that is outside of the output region, and the second flag indicating whether syntax information of the current block may be predicted using the information associated with the region in the RL picture that is outside of the output region.

9. The apparatus of claim 8, wherein the value of the second flag depends on the value of the first flag.

10. The apparatus of claim 1, wherein the processor is configured to determine whether the condition is satisfied by determining whether the RL picture and the EL picture have the same width and height.

11. The apparatus of Claim 1, wherein the processor is configured to determine whether the condition is satisfied by determining whether the layer ID value of the RL is equal to zero.

12. The apparatus of claim 1, wherein the processor is configured to determine whether the condition is satisfied by processing a flag.

13. The apparatus of claim 12, wherein a value of the flag is determined based on a codec used to code the RL.

14. A method of coding video information, the method comprising:
  storing video information associated with a reference layer (RL) and an enhancement layer (EL), the RL comprising an RL picture having an output region corresponding to a conformance cropping window of the RL, and the EL comprising an EL picture corresponding to the RL picture;
  determining that a current block in the EL picture at least partially corresponds to a region in the RL picture that is outside of the output region;
  determining, based on a condition, whether information associated with the region in the RL that is outside of the output region is available during the coding of the video information for predicting the current block in the EL picture, wherein the condition comprises one or more of (i) whether the RL picture and the EL picture have the same width and height, (ii) whether the RL conforms to High-Efficiency Video Coding (HEVC), and (iii) whether a layer identifier (ID) value associated with the RL is equal to zero; and
  performing one of (i) encoding or decoding the current block using the information associated with the region in the RL picture that is outside of the output region based on the condition being satisfied, or (ii) encoding or decoding the current block without using the information associated with the region in the RL picture that is outside of the output region based on the condition not being satisfied.

15. The method of claim 14, wherein the output region is smaller than the RL picture.

16. The method of claim 14, further comprising determining whether the RL conforms to HEVC based upon a codec used to code the RL.

17. The method of claim 16, further comprising determining whether the RL conforms to HEVC based on a flag that indicates whether the codec used to code the RL is an Advanced Video Coding (AVC) codec.

18. The method of claim 14, wherein determining whether the condition is satisfied comprises;
  processing a first flag indicating whether texture information of the current block may be predicted using the information associated with the region in the RL picture that is outside of the output region; and
  processing a second flag indicating whether syntax information of the current block may be predicted using the information associated with the region in the RL picture that is outside of the output region.

19. The method of claim 18, wherein the value of the second flag depends on the value of the first flag.

20. The method of claim 14, wherein determining whether the condition is satisfied comprises determining whether the RL picture and the EL picture have the same width and height.

21. The method of claim 14, wherein determining whether the condition is satisfied comprises determining whether the layer ID value of the RL is equal to zero.

22. The method of claim 14, wherein determining whether the condition is satisfied comprises processing a flag, a value of the flag being determined based on a codec used to code the RL.

23. A non-transitory computer readable medium comprising code that, when executed, causes an apparatus to:
  store video information associated with a reference layer (RL) and an enhancement layer (EL), the RL comprising an RL picture having an output region corresponding to a conformance cropping window of the RL, and the EL comprising an EL picture corresponding to the RL picture;
  determine that a current block in the EL picture at least partially corresponds to a region in the RL picture that is outside of the output region;
  determine, based on a condition, whether information associated with the region in the RL that is outside of the output region is available to the apparatus for use in predicting the current block in the EL picture, wherein the condition comprises one or more of (i) whether the RL picture and the EL picture have the same width and height, (ii) whether the RL conforms to High-Efficiency Video Coding (HEVC), and (iii) whether a layer identifier (ID) value associated with the RL is equal to zero; and
  perform one of (i) encode or decode the current block using the information associated with the region in the RL picture that is outside of the output region based on the condition being satisfied, or (ii) encode or decode the current block without using the information associated with the region in the RL picture that is outside of the output region based on the condition not being satisfied.

24. The computer readable medium of claim 23, wherein the code further causes the apparatus to determine whether the condition is satisfied based on whether the RL picture and the EL picture have the same width and height.

25. The computer readable medium of claim 23, wherein the code further causes the apparatus to determine whether the condition is satisfied based on whether the layer ID value of the RL is equal to zero.

26. The computer readable medium of claim 23, wherein the code further causes the apparatus to determine whether the condition is satisfied based on a flag.

27. A video coding device configured to code video information, the video coding device comprising:
  means for storing video information associated with a reference layer (RL) and an enhancement layer (EL), the RL comprising an RL picture having an output region corresponding to a conformance cropping window of the RL, and the EL comprising an EL picture corresponding to the RL picture;
  means for determining that a current block in the EL picture at least partially corresponds to a region in the RL picture that is outside of the output region;
  means for determining, based on a condition, whether information associated with the region in the RL that is outside of the output region is available to the video coding device for use in predicting the current block in the EL picture, wherein the condition comprises one or more of (i) whether the RL picture and the EL picture have the same width and height, (ii) whether the RL conforms to High-Efficiency Video Coding (HEVC), and (iii) whether a layer identifier (ID) value associated with the RL is equal to zero; and means for performing one of (i) encoding or decoding the current block using the information associated with the region in the RL picture that is outside of the output region based on the condition being satisfied, or (ii) encoding or decoding the current block without using the information associated with the region in the RL picture that is outside of the output region based on the condition not being satisfied.

28. The video coding device of claim 27, further comprising means for determining whether the condition is satisfied based on whether the RL picture and the EL picture have the same width and height.

29. The video coding device of claim 27, further comprising means for determining whether the condition is satisfied based on whether the layer ID value of the RL is equal to zero.

30. The video coding device of claim 27, further comprising means for determining whether the condition is satisfied based on a flag.

* * * * *